United States Patent
Lee et al.

(10) Patent No.: US 12,550,517 B2
(45) Date of Patent: Feb. 10, 2026

(54) SAME FOCAL PLANE PIXEL DESIGN FOR RGB-IR IMAGE SENSORS

(71) Applicant: Apple Inc., Cupertino, CA (US)

(72) Inventors: Hong Wei Lee, San Jose, CA (US); Oray O. Cellek, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 630 days.

(21) Appl. No.: 17/950,325

(22) Filed: Sep. 22, 2022

(65) Prior Publication Data

US 2024/0107782 A1 Mar. 28, 2024

(51) Int. Cl.
| | |
|---|---|
| H04N 25/131 | (2023.01) |
| G01J 5/10 | (2006.01) |
| H04N 25/79 | (2023.01) |
| H10F 39/00 | (2025.01) |
| H10F 39/18 | (2025.01) |
| H10K 19/20 | (2023.01) |

(Continued)

(52) U.S. Cl.
CPC ............... *H10K 19/20* (2023.02); *G01J 5/10* (2013.01); *H04N 25/131* (2023.01); *H04N 25/79* (2023.01); *H10F 39/014* (2025.01); *H10F 39/018* (2025.01); *H10F 39/024* (2025.01); *H10F 39/182* (2025.01); *H10F 39/8027* (2025.01); *H10F 39/8053* (2025.01); *H10F 39/8063* (2025.01); *H10F 39/807* (2025.01); *H10F 39/809* (2025.01); *H10K 39/32* (2023.02); *G01J 2005/0077* (2013.01); *G01J 2005/106* (2013.01)

(58) Field of Classification Search
CPC .... H10F 39/014; H10F 39/018; H10F 39/024; H10F 39/182; H10F 39/184; H10F 39/8027; H10F 39/8053; H10F 39/8063; H10F 39/807; H10F 39/809; H10K 19/20; H10K 39/32; H10K 59/65; G01J 5/10; G01J 2005/0077; G01J 2005/106; H04N 25/131; H04N 25/79

See application file for complete search history.

(56) References Cited

U.S. PATENT DOCUMENTS

| | | | |
|---|---|---|---|
| 6,476,783 B2 | 11/2002 | Matthies et al. | |
| 7,349,574 B1 | 3/2008 | Sodini et al. | |

(Continued)

FOREIGN PATENT DOCUMENTS

| | | |
|---|---|---|
| CN | 105229788 | 1/2016 |
| CN | 106104565 | 11/2016 |

(Continued)

OTHER PUBLICATIONS

Charlet et al., "Chip-to-chip interconnections based on the wireless capacitive coupling for 3D integration," *Microelectronic Engineering*, vol. 83, 2006, pp. 2195-2199.

(Continued)

*Primary Examiner* — Nelson Garces
(74) *Attorney, Agent, or Firm* — Brownstein Hyatt Farber Schreck, LLP

(57) ABSTRACT

A sensor module includes a silicon substrate. A set of isolation walls defines, in the silicon substrate, an array of silicon-based image sensor pixels and an array of cavities. An infrared (IR)-sensitive material in the array of cavities forms an array of IR sensor pixels in a same focal plane as the array of silicon-based image sensor pixels.

15 Claims, 19 Drawing Sheets

(51) Int. Cl.
*H10K 39/32* (2023.01)
*G01J 5/00* (2022.01)

(56) References Cited

U.S. PATENT DOCUMENTS

| | | | |
|---|---|---|---|
| 8,111,306 B2 | 2/2012 | Kuruma et al. |
| 8,128,890 B2 | 3/2012 | Tibbe et al. |
| 8,497,460 B2 | 7/2013 | Nakayama |
| 8,792,020 B2 | 7/2014 | Lee et al. |
| 8,957,358 B2 | 2/2015 | Wan et al. |
| 8,963,886 B2 | 2/2015 | Wassvik |
| 8,975,752 B2 | 3/2015 | Chow et al. |
| 9,312,294 B2 | 4/2016 | Chuang et al. |
| 9,349,035 B1 | 5/2016 | Gerber |
| 9,362,320 B2 | 6/2016 | Yamashita et al. |
| 9,372,283 B2 | 6/2016 | Nikoobakht |
| 9,437,132 B2 | 9/2016 | Rappoport et al. |
| 9,445,026 B2 | 9/2016 | Kobayashi et al. |
| 9,594,476 B2 | 3/2017 | Yang et al. |
| 9,720,535 B2 | 8/2017 | Yang et al. |
| 9,860,467 B2 | 1/2018 | Kim et al. |
| 10,026,771 B1 | 7/2018 | Lee et al. |
| 10,042,467 B2 | 8/2018 | Schwartz et al. |
| 10,146,258 B2 | 12/2018 | Sinha et al. |
| 10,181,070 B2 | 1/2019 | Smith et al. |
| 10,205,898 B2 | 2/2019 | McMahon et al. |
| 10,360,431 B2 | 7/2019 | Gozzini et al. |
| 10,394,014 B2 | 8/2019 | Sakai |
| 10,481,420 B2 | 11/2019 | Bonod et al. |
| 10,635,878 B2 | 4/2020 | Yi et al. |
| 10,658,404 B2 | 5/2020 | Abe et al. |
| 10,685,202 B2 | 6/2020 | Kim et al. |
| 10,713,458 B2 | 7/2020 | Bhat et al. |
| 10,733,408 B2 | 8/2020 | Bok |
| 10,733,931 B2 | 8/2020 | Jung et al. |
| 10,739,807 B2 | 8/2020 | Lallement et al. |
| 10,838,126 B2 | 11/2020 | Wang et al. |
| 10,868,064 B2 | 12/2020 | Wada et al. |
| 11,073,712 B2 | 7/2021 | Yeke Yazdandoost et al. |
| 11,121,165 B2 | 9/2021 | Lee et al. |
| 11,177,311 B2 | 11/2021 | Juen et al. |
| 11,619,857 B2 | 4/2023 | Li et al. |
| 2005/0002448 A1 | 1/2005 | Knight et al. |
| 2005/0174335 A1 | 8/2005 | Kent et al. |
| 2008/0054320 A1 | 3/2008 | Solhusvik et al. |
| 2010/0045364 A1 | 2/2010 | Law et al. |
| 2011/0115041 A1 | 5/2011 | Dan et al. |
| 2012/0262408 A1 | 10/2012 | Pasquero et al. |
| 2014/0133715 A1 | 5/2014 | Ballard et al. |
| 2015/0177884 A1 | 6/2015 | Han |
| 2015/0177979 A1 | 6/2015 | Johansson et al. |
| 2016/0163753 A1 | 6/2016 | Yu et al. |
| 2018/0074627 A1 | 3/2018 | Kong et al. |
| 2018/0358393 A1 | 12/2018 | Sato et al. |
| 2021/0240026 A1 | 8/2021 | Yeke Yazdandoost et al. |
| 2021/0311240 A1 | 10/2021 | Siddique et al. |
| 2022/0115428 A1 | 4/2022 | Borremans |
| 2022/0272291 A1 | 8/2022 | Mas et al. |
| 2022/0320173 A1* | 10/2022 | Chou ............... H10F 39/807 |
| 2023/0068723 A1* | 3/2023 | Hsieh ............... H10F 39/807 |
| 2023/0236469 A1 | 7/2023 | Li et al. |
| 2023/0261029 A1* | 8/2023 | Ebiko ............... H10F 39/12 |
| | | 257/431 |
| 2024/0064432 A1 | 2/2024 | Yan et al. |

FOREIGN PATENT DOCUMENTS

| | | |
|---|---|---|
| CN | 106298856 | 1/2017 |
| CN | 107004130 | 8/2017 |
| CN | 107870689 | 4/2018 |
| JP | 2009042870 | 2/2009 |
| KR | 1020170113066 | 10/2017 |
| WO | WO 20/052607 | 5/2010 |
| WO | WO 15/005959 | 1/2015 |
| WO | WO 15/191557 | 12/2015 |
| WO | WO 17/211152 | 12/2017 |
| WO | WO 18/040512 | 3/2018 |
| WO | WO 22/061016 | 3/2022 |

OTHER PUBLICATIONS

Han et al., "Deep Trench Isolation and Inverted Pyramid Array Structures Used to Enhance Optical Efficiency of Photodiode in CMOS Image Sensor via Simulations," Sensors, vol. 20, No. 3062, 2020, pp. 1-14.

Neubrech et al Science Advances 2020, vol. 6: eabc2709, Sep. 4, 2020, 21 pages.

U.S. Appl. No. 17/330,274, filed May 25, 2021, Li et al.

U.S. Appl. No. 17/891,963, filed Aug. 19, 2022, Yan et al.

* cited by examiner

SAME FOCAL PLANE PIXEL DESIGN FOR RGB-IR IMAGE SENSORS

FIELD

The described embodiments generally relate to image sensors and, more particularly, to sensing different types of images (e.g., visible light images and infrared (IR) images) using a single sensor module.

BACKGROUND

Some electronic devices (e.g., mobile phones or tablet computers) may include both a visible light image sensor (e.g., a red-green-blue (RGB) image sensor) and an IR image sensor (e.g., a depth sensor used for bio-authentication (e.g., face identification) or navigation). The visible light image sensor and IR image sensor are often provided as components of two separate camera modules. One of the camera modules is optimized for visible light image acquisition, and one of the camera modules is optimized for IR image acquisition. This usually requires a larger area adjacent a device's display to be dedicated for the apertures of the two camera modules, thereby limiting the device's display area and impacting a user's viewing experience. Two camera modules, each having a different focus, also limit how visible light and IR images can be used in combination and/or make using the images in combination more difficult (e.g., because the images acquired by the different image sensors are not inherently aligned).

In some cases, visible light and IR image sensors may be integrated in a same plane, with some of the pixels of the visible light image sensor being replaced by IR sensor pixels. However, this reduces the quality of the visible light image and increases the complexity of de-mosaicing operations. Also, to prevent significant degradation of the visible light image, IR sensor pixels may be introduced relatively sparsely, resulting in a poor quality IR image with limited applications.

In some cases, visible light and IR image sensors may be stacked—typically with the IR image sensor being positioned behind the visible light image sensor. Although this enables full resolution visible light and IR images to be acquired, and ensures that the images are aligned, the visible light image sensor needs to be designed to pass IR light, and the IR light that passes through the visible light image sensor may interfere with acquisition of a visible light image. On the other hand, IR light may be absorbed or reflected away by components of the visible light image sensor, thereby reducing the amount of IR light that propagates to the IR image sensor and reducing the signal-to-noise ratio (SNR) of the IR image sensor. Another disadvantage of stacked image sensors is that the image sensors are in different focal planes. Lenses may therefore focus light on an image sensor (typically the visible light image sensor), and an image acquired by the other image sensor (typically the IR image sensor) may be slightly out of focus.

SUMMARY

Embodiments of the systems, devices, methods, and apparatus described in the present disclosure are directed to sensor modules having an array of image sensor pixels (e.g., visible light image sensor pixels) and an array of IR sensor pixels.

In a first aspect, the present disclosure describes a sensor module. The sensor module may include a silicon substrate. A set of isolation walls may define, in the silicon substrate, an array of silicon-based image sensor pixels and an array of cavities. An IR-sensitive material in the array of cavities may form an array of IR sensor pixels in a same focal plane as the array of silicon-based image sensor pixels.

In a second aspect, the present disclosure describes another sensor module. The sensor module may include a silicon substrate; an array of thermally annealed silicon-based image sensor pixels in the silicon substrate; an array of IR sensor pixels in a same focal plane as the array of silicon-based image sensor pixels, with each IR sensor pixel including an IR-sensitive material; and an application-specific integrated circuit (ASIC) bonded to the silicon substrate.

In a third aspect, the present disclosure describes a method of forming a sensor module. The method may include forming a set of isolation walls that define, in a first silicon substrate, an array of silicon-based image sensor pixels. The method may also include forming a set of transistors on at least one of the first silicon substrate or a second silicon substrate, and bonding the first silicon substrate and the second silicon substrate, after forming the set of isolation walls, with the set of transistors disposed between the first silicon substrate and the second silicon substrate. The method may further include etching a set of cavities in the first silicon substrate after bonding the first silicon substrate and the second silicon substrate. Cavities of the set of cavities may be interspersed with silicon-based image sensor pixels of the array of silicon-based image sensor pixels, and cavities of the set of cavities may be bounded by isolation walls of the set of isolation walls. The method may also include thermally annealing at least the array of silicon-based image sensor pixels and, after the thermal anneal, depositing an IR-sensitive material in the array of cavities to form an array of IR sensor pixels in a same focal plane as the array of silicon-based image sensor pixels.

In addition to the aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
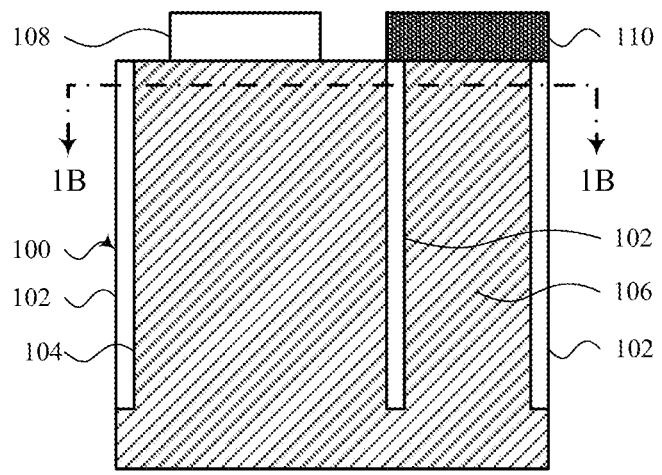
FIGS. 1A-1H illustrate a first sequence of steps for making a sensor module.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments and appended claims.

Described herein are sensor modules in which an array of image sensor pixels (i.e., visible light image sensor pixels) is formed in a same focal plane as an array of IR sensor pixels. The IR sensor pixels may be interspersed with the image sensor pixels, and may be provided in equal or different numbers compared to the image sensor pixels.

By positioning an array of image sensor pixels and an array of IR sensor pixels in a same focal plane, IR light does not need to travel through the array of image sensor pixels to reach the IR sensor pixels. This can increase the sensitivity of the IR sensor pixels, reduce optical crosstalk, and improve the modulation transfer function (MTF) of both the visible light image sensor and the IR sensor.

In various embodiments, the relationship between the size of the image sensor pixels and the size of the IR sensor pixels may be varied. Separate microlenses may be deposited over each of the image sensor pixels and IR sensor pixels.

In some embodiments, high temperature processes may be completed before an IR-sensitive material is deposited to form the IR sensor pixels, because silicon-based image sensor pixels may withstand the high temperature processes, but the IR-sensitive material may not.

These and other embodiments are described with reference to FIGS. 1A-11. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "above", "below", "left", "right", etc. is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. The use of alternative terminology, such as "or", is intended to indicate different combinations of the alternative elements. For example, A or B is intended to include, A, or B, or A and B.

FIGS. 1A-1H illustrate a first sequence of steps for making a sensor module. Although the sensor module is shown to have a singular image sensor pixel and a singular IR sensor pixel (see, e.g., FIGS. 1G and 1H, the sequence of operations illustrated in FIGS. 1A-1H may be used to form an array of image sensor pixels (e.g., an array of any number of image sensor pixels, such as millions of image sensor pixels) and an array of IR sensor pixels (e.g., an array of any number of IR sensor pixels, such as millions of IR sensor pixels) in parallel, with IR sensor pixels of the array of IR sensor pixels interspersed with image sensor pixels of the array of image sensor pixels.

Figure 1B:
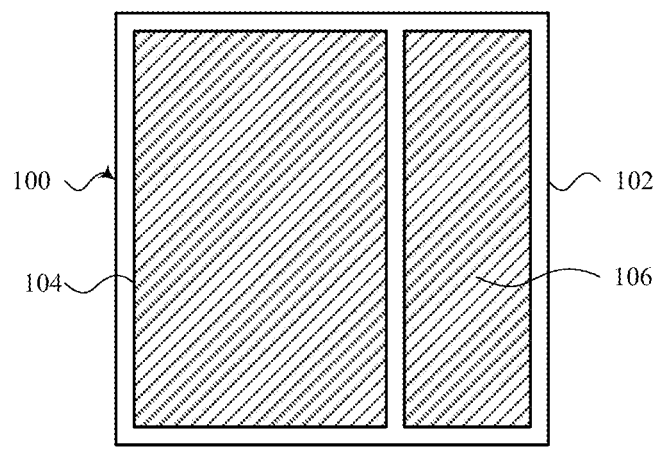

As shown in FIGS. 1A and 1B, a set of isolation walls 102 may be formed in a first silicon substrate 100. FIG. 1A shows an elevation of the first silicon substrate 100 and the set of isolation walls 102, and FIG. 1B shows a top plan view of the first silicon substrate 100 and set of isolation walls 102, taken along view line 1B-1B in FIG. 1A. As shown, the set of isolation walls 102 defines an image sensor pixel 104 (e.g., a silicon-based image sensor pixel, which may be biased and operated as a silicon-based photodiode) and an area of silicon 106 that will eventually be removed to form an IR sensor pixel. The set of isolation walls 102 may include deep trench isolation (DTI) walls or shallow trench isolation (STI) walls, and may be formed using an oxide, other dielectric, or combination of oxide (or dielectric) and other materials. In some embodiments, electrical connections (e.g., conductive vias or biasing mechanisms) may be embedded in or abutted to the set of isolation walls 102. The set of isolation walls 102 may fully surround each of the image sensor pixel 104 and the area of silicon 106, or the set of isolation walls 102 may include gaps or notches at one or more positions around the image sensor pixel 104 or area of silicon 106.

After formation of the set of isolation walls 102, a polysilicon (poly) gate 108 of a transistor may be formed on the image sensor pixel 104, and an electrode 110 (e.g., a bottom electrode) may be formed on the area of silicon 106, as shown in FIG. 1A.

Figure 1C:
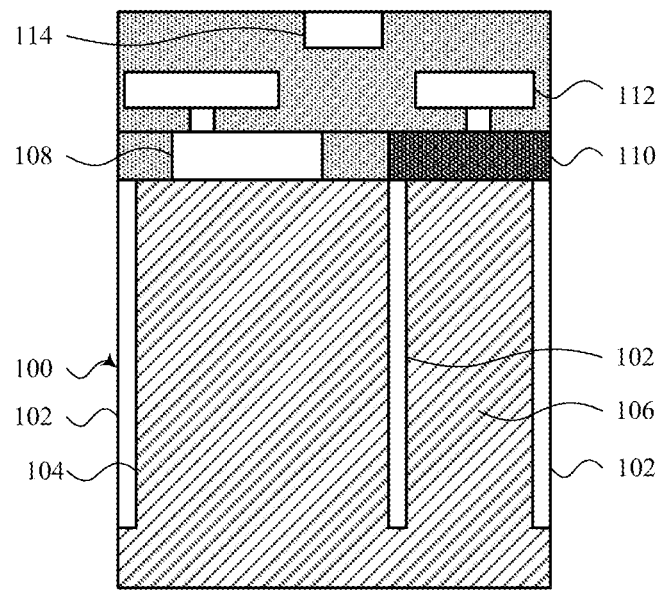

In FIG. 1C, a set of optional transistors, set of conductors 112, and/or set of electrical contacts 114 may be formed on the first silicon substrate 100, along with conductive vias, conductive traces, or other electrical or non-electrical components (e.g., dielectrics). In some embodiments, one or more of the transistors may be electrically connected to the poly gate 108, and one or more of the transistors may be electrically connected to the electrode 110. Some of the transistors may provide part or all of the readout circuitry that is electrically coupled to an array of image sensor pixels (including the image sensor pixel 104). Some of the transistors may provide part or all of the readout circuitry that is electrically coupled to an array of IR sensor pixels (including an IR sensor pixel that will ultimately replace the area of silicon 106). The set of transistors 108 may also include transistors that bias or reset image or IR sensor pixels, transistors, or transistors used for other purposes.

Figure 1D:
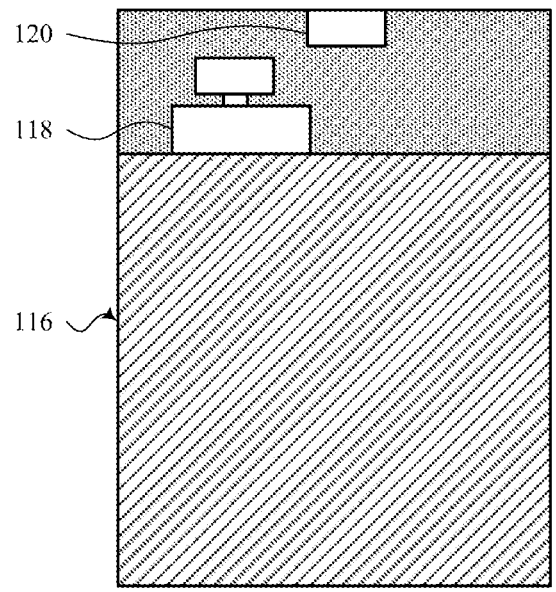

As shown in FIG. 1D, an additional optional set of transistors 118 and an additional set of electrical contacts 120 may be formed on a second silicon substrate 116, along with conductive vias, conductive traces, or other electrical or non-electrical components (e.g., dielectrics). The second silicon substrate 116, transistors 118, electrical contacts 120, or other components may form an ASIC. In some embodiments, the second substrate 116 may be formed of a material other than silicon.

The transistors 108 and/or 118 may include front-end-of-line (FEOL) transistors (e.g., planar or vertical gate transistors) and back-end-of-line (BEOL) transistors.

Figure 1E:
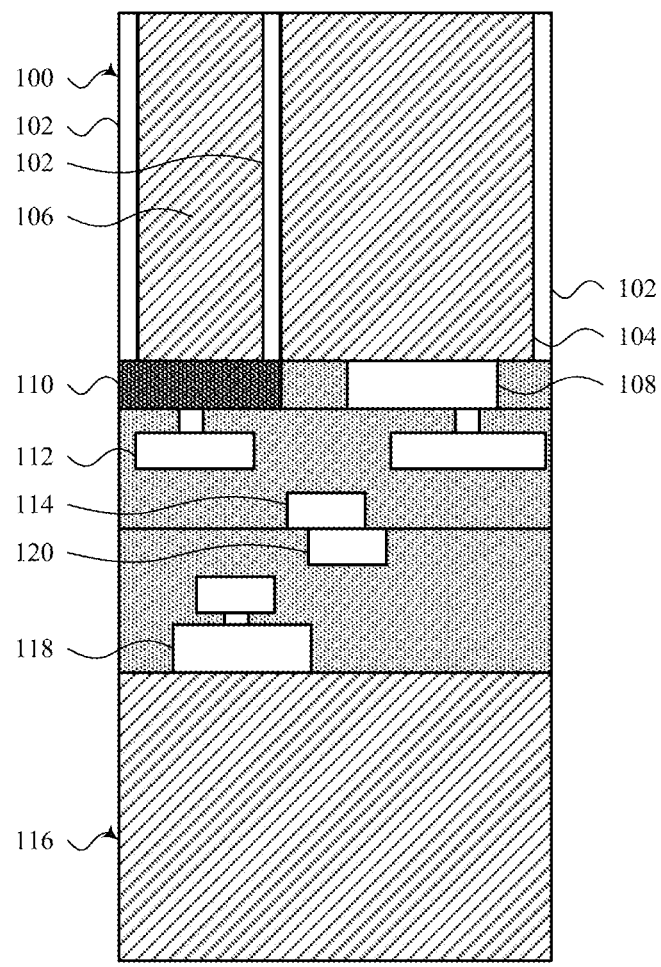

One of the first or second silicon substrates 100, 116 may be flipped, and the second silicon substrate 116 may be bonded to the first silicon substrate 100, as shown in FIG. 1E. In FIG. 1E, the second silicon substrate 116 is flipped. The first and second silicon substrates 100, 116 may be bonded using at least one of a conductive material (e.g., a conductive adhesive or solder that electrically bonds the electrical contacts 120 to the electrical contacts 114) and/or a non-conductive material (e.g., a non-conductive adhesive or oxide). In some embodiments, the first and second silicon substrates 100, 116 may be bonded using a combination of different types of materials (e.g., a hybrid bond including copper-to-copper bonds and oxide-to-oxide bonds). The first and second silicon substrates 100, 116 may be bonded with the set(s) of transistors 108, 118 disposed between the first and second silicon substrates 100, 116.

After the first and second silicon substrates 100, 116 are bonded, the first and/or second silicon substrate 100, 116 may be thinned (e.g., backside illumination (BSI) wafer thinning, including a silicon backgrind, wet etch, and chemical mechanical planarization (CMP), may be performed). BSI metal shields may also be deposited and patterned for optical black pixels (e.g., reference or calibration pixels).

Figure 1F:
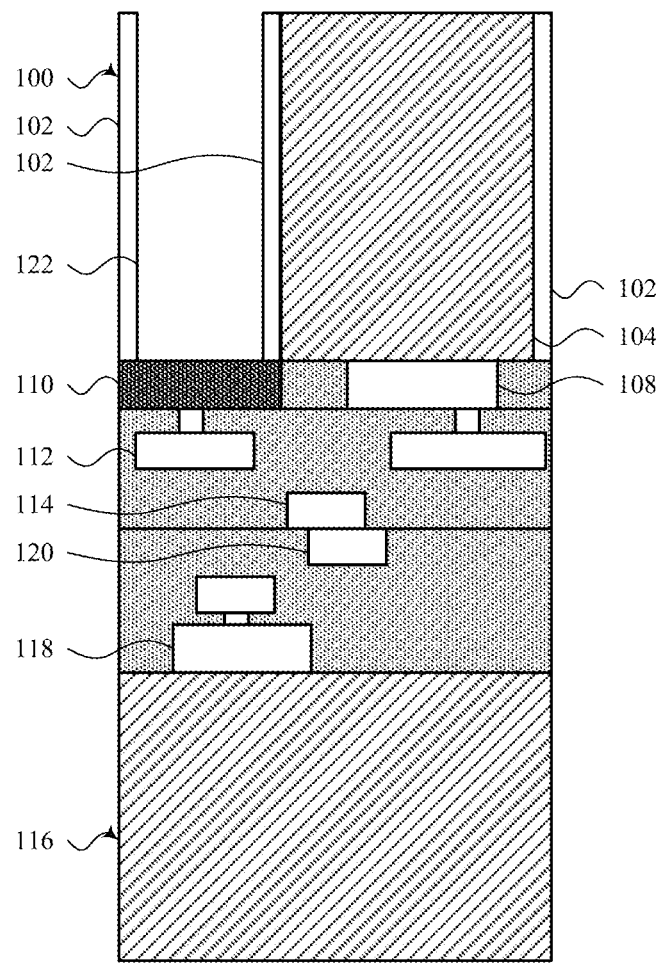

In FIG. 1F, a set of cavities, including a cavity 122, may be etched in the first silicon substrate 100. The cavity 122 may be bounded by isolation walls of the set of isolation walls 102. In some embodiments, the cavity 122 may be etched using a selective wet etch or selective dry etch process. Etching the cavity 122 removes the area of silicon 106 shown in FIGS. 1A-1E.

After performing the operations shown in FIGS. 1A-1F, an array of image sensor pixels including the image sensor pixel 104, or the entirety of a sensor module including an array of structures such as the structure shown in FIG. 1F, may be thermally annealed. In some embodiments, the anneal may be performed at a temperature of approximately 400 degrees Celsius (e.g., a temperature of >400° C.). The anneal is considered a high temperature process, and may be used to recover dark current (hot pixels) in the array of image sensor pixels, and may be performed before depositing an IR-sensitive material in the cavity 122, to avoid damaging the IR-sensitive material.

Figure 1G:
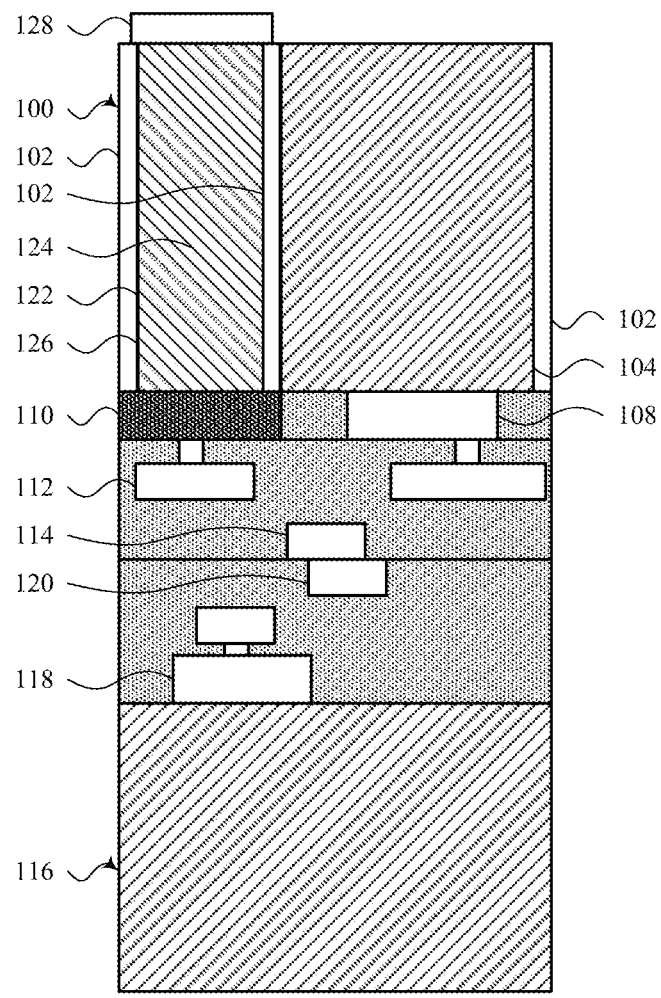

After the thermal anneal, and as shown in FIG. 1G, an IR-sensitive material 124 may be deposited in the set of cavities including the cavity 122. In some embodiments, the IR-sensitive material 124 may include at least one of an organic material or a quantum film (QF). The IR-sensitive material 124 may be deposited, for example, using a dry solvent and pattern (a low temperature process). For purposes of this description, low temperature processes may be formed at or lower than about half of the thermal anneal temperature (e.g., at or about 200° C. or less). Deposition of the IR-sensitive material 124 may form an array of IR sensor pixels, including an IR sensor pixel 126, in a same focal plane as the array of silicon-based image sensor pixels including the image sensor pixel 104.

As also shown in FIG. 1G, an electrode 128 (e.g., a top electrode) may be formed on the IR-sensitive material 124 of the IR sensor pixel 126 (also a low temperature process).

In some embodiments, the top electrode 128 may be performed as part of a common bias electrode for all of the IR sensor pixels 126 (e.g., as part of a grid). In contrast, the bottom electrode 110 may be formed per IR sensor pixel 126.

Figure 1H:
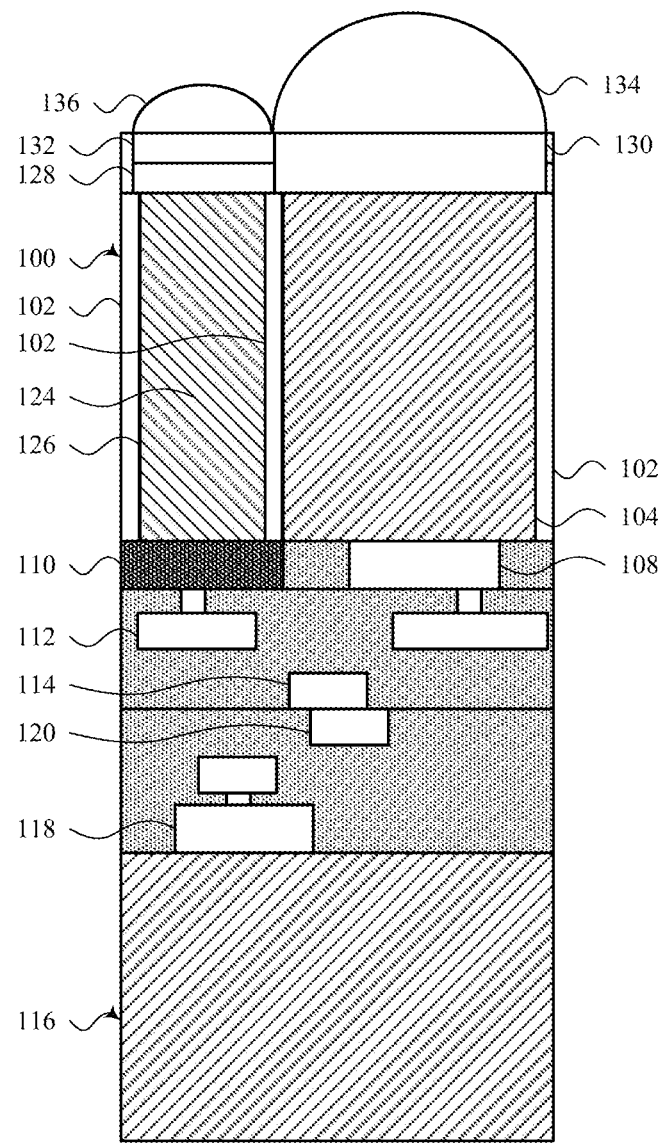

FIG. 1H shows additional optional steps of the first sequence of steps for making a sensor module. As shown, a color filter 130 may be deposited on the image sensor pixel 104. In some embodiments, an array of color filters may be tiled over an array of image sensor pixels including the image sensor pixel 104. In some embodiments, the array of color filters may form an array of Bayer pattern color filter arrays (i.e., an array of color filter arrays in which each color filter array includes first and second green color filters disposed along a first diagonal of the color filter array, and red and blue color filters disposed along a second diagonal of the color filter array).

As also shown in FIG. 1H, an IR pass filter 132 (i.e., a filter that only passes one, a range, or all IR wavelengths) may be deposited on the IR sensor pixel 126. Both the color filter 130 and the IR pass filter 132 may be deposited using low temperature processes.

After depositing the color filter 130 and IR pass filter 132, respective microlenses 134, 136 may be formed on (or attached to) the image sensor pixel 104 and the IR sensor pixel 126. The microlenses 134, 136 may be formed in a same operation or in different operations.

In some embodiments, an optional anti-reflective coating (an ARC; e.g., a BSI ARC) may be deposited on the image sensor pixel 104 or IR sensor pixel 126 before the color filter 130 or IR pass filter 132 is deposited. In some embodiments, an additional or alternative ARC may be deposited on the color filter 130 or the IR pass filter 132, or on a light-receiving surface of the microlens 134 or 136. Any or all of the ARCs may be deposited using low temperature processes.

Although the image sensor pixel 104 and IR sensor pixel 126 are shown in FIGS. 1A-1H to have equal size widths, the image sensor pixel 104 and IR sensor pixel 126 may alternatively have different size widths (or different light-receiving cross-sections).

Figure 2A:
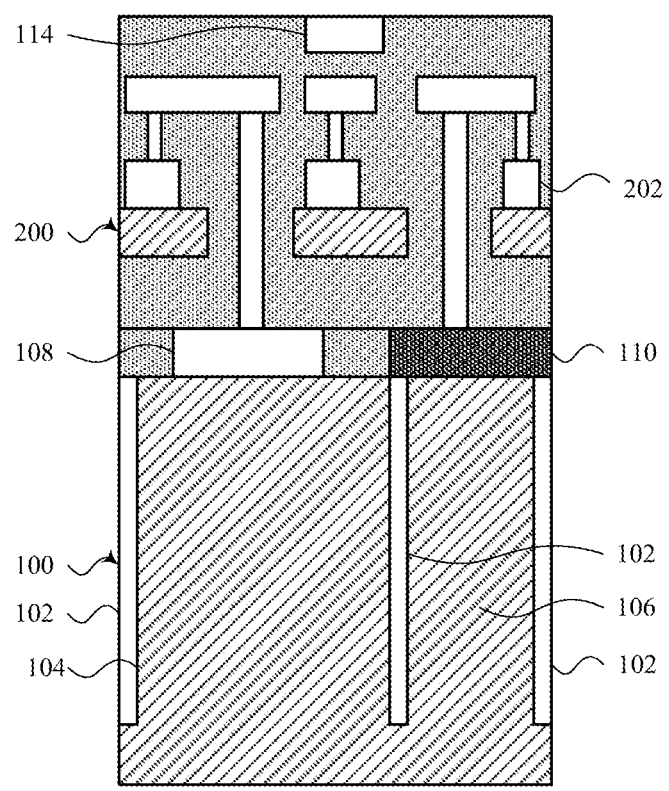
FIGS. 2A and 2B, in combination with FIGS. 1A-1H, illustrate a second sequence of steps for making a sensor module.
Figure 2B:
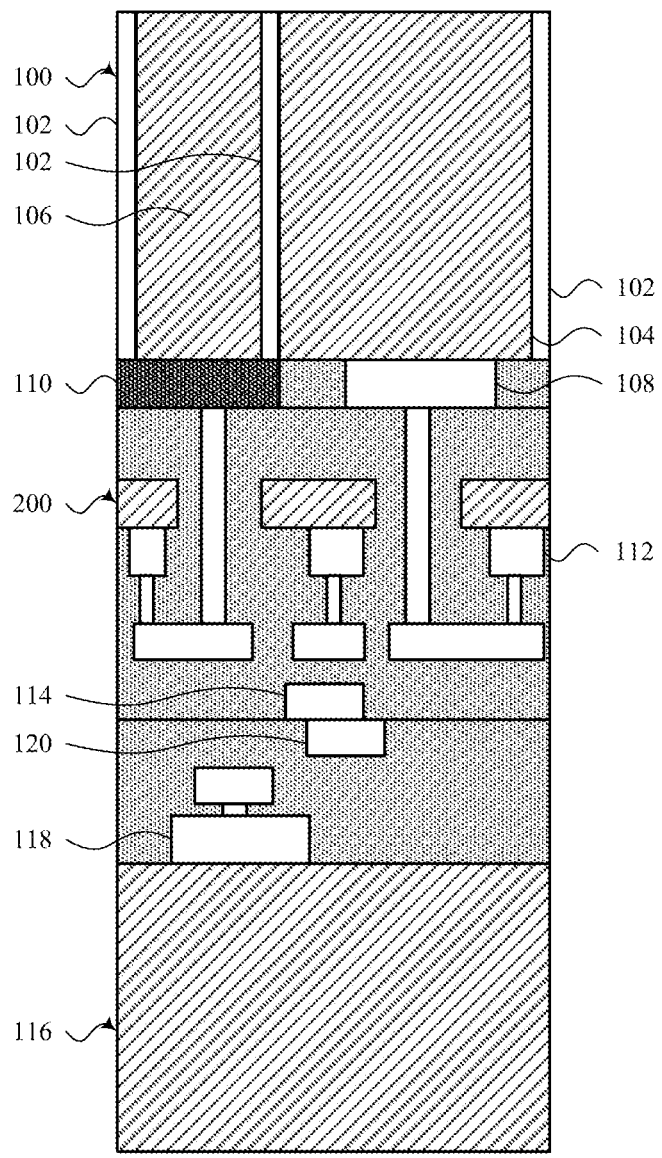

FIGS. 2A and 2B, in combination with FIGS. 1A-1H, illustrate a second sequence of steps for making a sensor module. Although the sensor module is shown to have a singular image sensor pixel and a singular IR sensor pixel (see, e.g., FIGS. 1G and 1H, the sequence of operations illustrated in FIGS. 2A, 2B, and 1A-1H may be used to form an array of image sensor pixels (e.g., an array of any number of image sensor pixels, such as millions of image sensor pixels) and an array of IR sensor pixels (e.g., an array of any number of IR sensor pixels, such as millions of IR sensor pixels), in which IR sensor pixels of the array of IR sensor pixels are interspersed with image sensor pixels of the array of image sensor pixels.

In accord with the second sequence of steps, a first silicon substrate 100 may be initially processed as described with reference to FIGS. 1A-1C. However, the operations at FIG. 1C may be supplemented as shown in FIG. 2A, to bond one or more substrates 200 (e.g., one or more silicon substrates) including additional layers of transistors, electrical contacts, conductive vias, conductive traces, dielectrics, and/or other electrical or non-electrical components on the layers (of the first silicon substrate 100) that include the set of transistors 202. In some embodiments, the transistors 202 may include a dual conversion gain transistor for the silicon-based image sensor pixel 104, signal storage or noise cancelation transistors for the IR sensor pixel 126, or other transistors. One of the substrates 200 may include the set of electrical contacts 114 that is bonded to the set of electrical contacts 120 on the second silicon substrate (as shown in FIG. 2B). In this regard, the bonded first and second silicon substrates 100, 116 shown in FIG. 1E may be replaced with the bonded first and second silicon substrates 100, 116 shown in FIG. 2B. In FIG. 2B, however, the second silicon substrate 116 may be bonded to the first silicon substrate 100 by means of the one or more substrates 200. Additional processing of the stacked structures shown in FIG. 2B may then be performed as described with reference to FIGS. 1F-1H.

Figure 3:
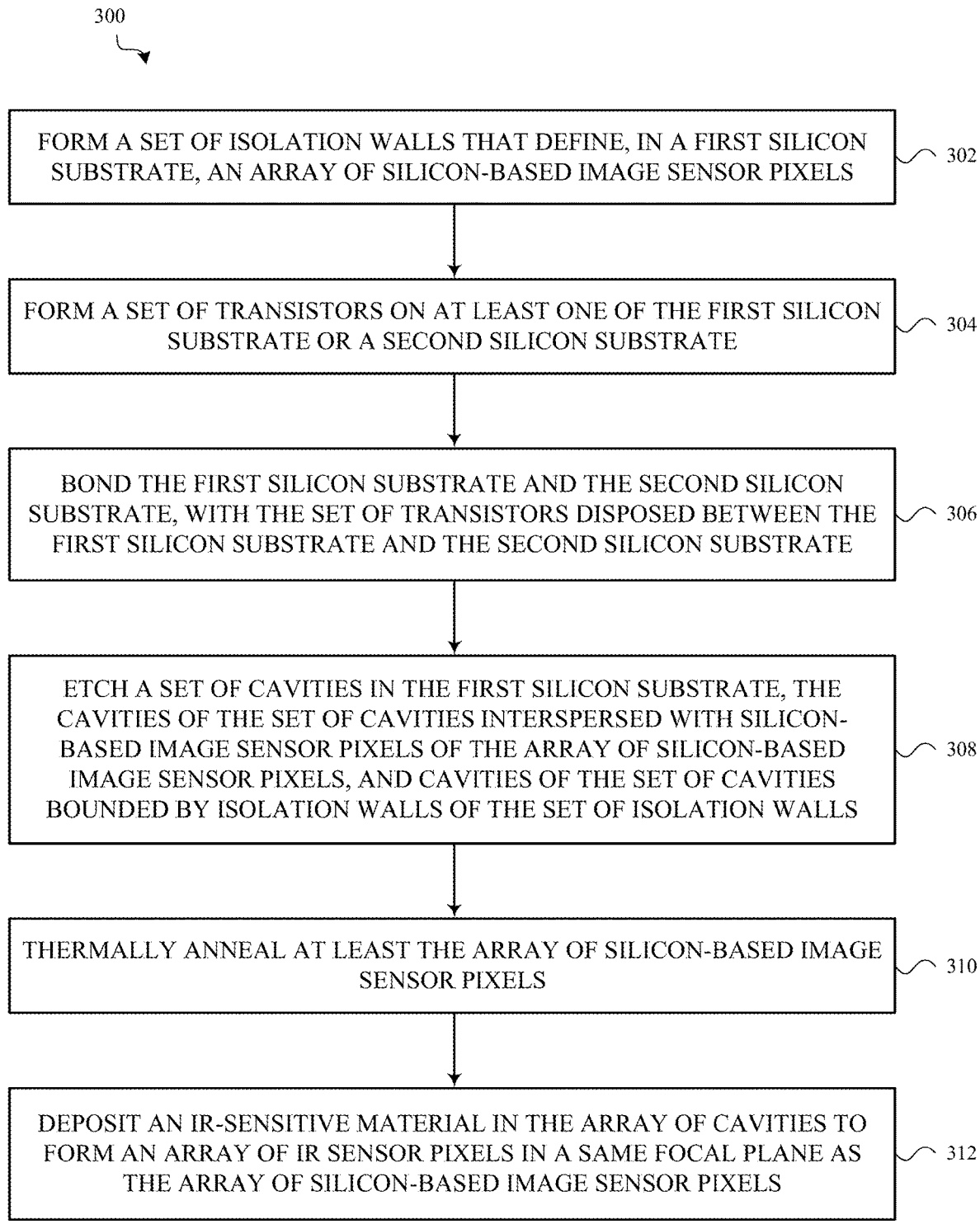
FIG. 3 shows an example method of forming a sensor module, in accord with the sequences of steps illustrated in FIGS. 1A-1H, 2A, and 2B.

FIG. 3 shows an example method 300 of forming a sensor module, in accord with the sequences of steps illustrated in FIGS. 1A-1H, 2A, and 2B.

At 302, the method 300 may include forming a set of isolation walls. The set of isolation walls may define, in a first silicon substrate, an array of silicon-based image sensor pixels.

At 304, the method 300 may include forming a set of transistors on at least one of the first silicon substrate or a second silicon substrate.

At 306, the method 300 may include bonding the first silicon substrate and the second silicon substrate. The bonding may occur after forming the set of isolation walls, and with the set of transistors disposed between the first silicon substrate and the second silicon substrate.

At 308, the method 300 may include etching a set of cavities in the first silicon substrate. The set of cavities may be etched after bonding the first silicon substrate and the second silicon substrate. The set of cavities may be interspersed between silicon-based image sensor pixels of the array of silicon-based image sensor pixels. Each cavity of the set of cavities may be bounded by isolation walls of the set of isolation walls.

At 310, the method 300 may include thermally annealing at least the array of silicon-based image sensor pixels.

At 312, and after the thermal anneal, the method 300 may include depositing an IR-sensitive material in the array of cavities to form an array of IR sensor pixels. The array of IR sensor pixels may be formed in a same focal plane as the array of silicon-based image sensor pixels.

In some embodiments, the method 300 may include forming a first set of electrodes for the array of IR sensor pixels on the first silicon substrate, before bonding the first silicon substrate and the second silicon substrate. The method 300 may also include forming a second set of electrodes for the array of IR sensor pixels on the IR-sensitive material, after depositing the IR-sensitive material in the array of cavities.

In some embodiments, the method 300 may include, after depositing the IR-sensitive material in the array of cavities, forming a color filter array on the silicon-based image sensor pixels, and forming microlenses in light-receiving paths of the silicon-based image sensor pixels and the IR sensor pixels. A first subset of the microlenses may be formed in the light-receiving paths of the image sensor pixels, and a second subset of the microlenses may be formed in the light-receiving paths of the IR sensor pixels. The microlenses of the first and second subsets may have respective first and second sizes that are the same or different, as described, for example, with reference to FIGS. 4A and 5-9.

The method 300 may be variously embodied, extended, or adapted, as described with reference to FIGS. 1, 2, 4A-9, and elsewhere in this description.

Figure 4A:
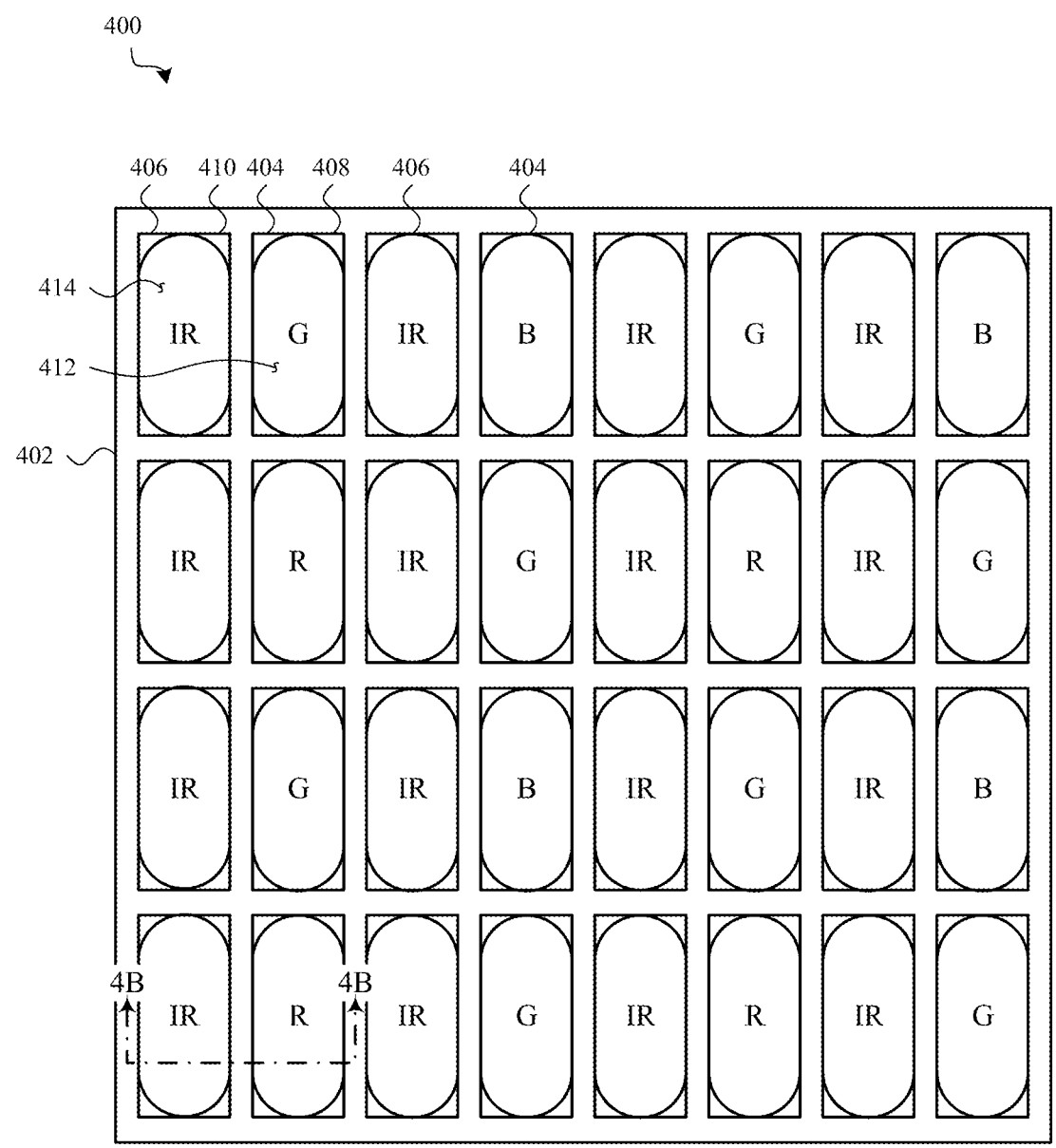
FIGS. 4A and 5-9 show various plan views of sensor modules having an array of image sensor pixels and an array of IR sensor pixels, in which IR sensor pixels of the array of IR sensor pixels are interspersed with image sensor pixels of the array of image sensor pixels.
Figure 5:
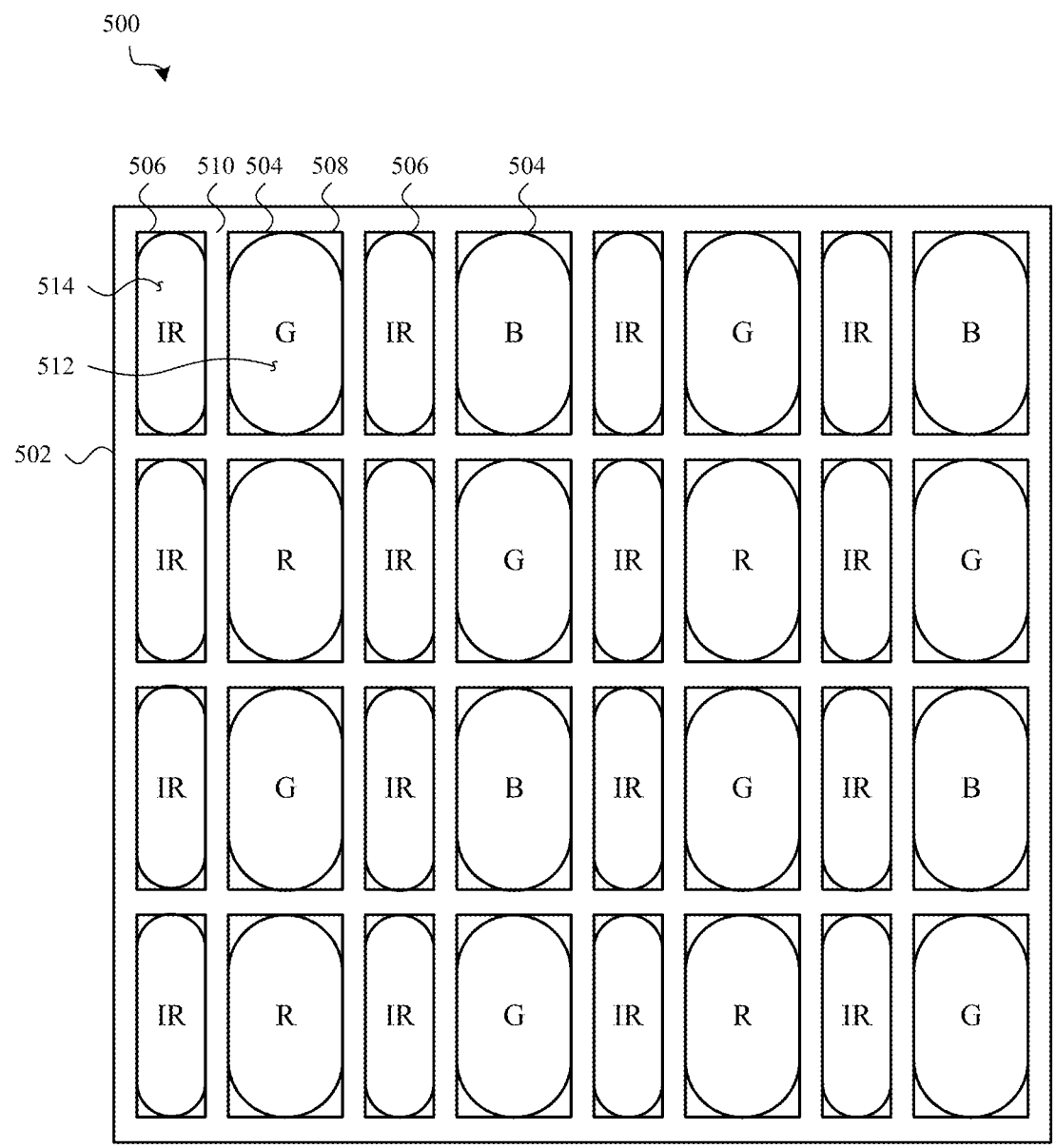
Figure 6:
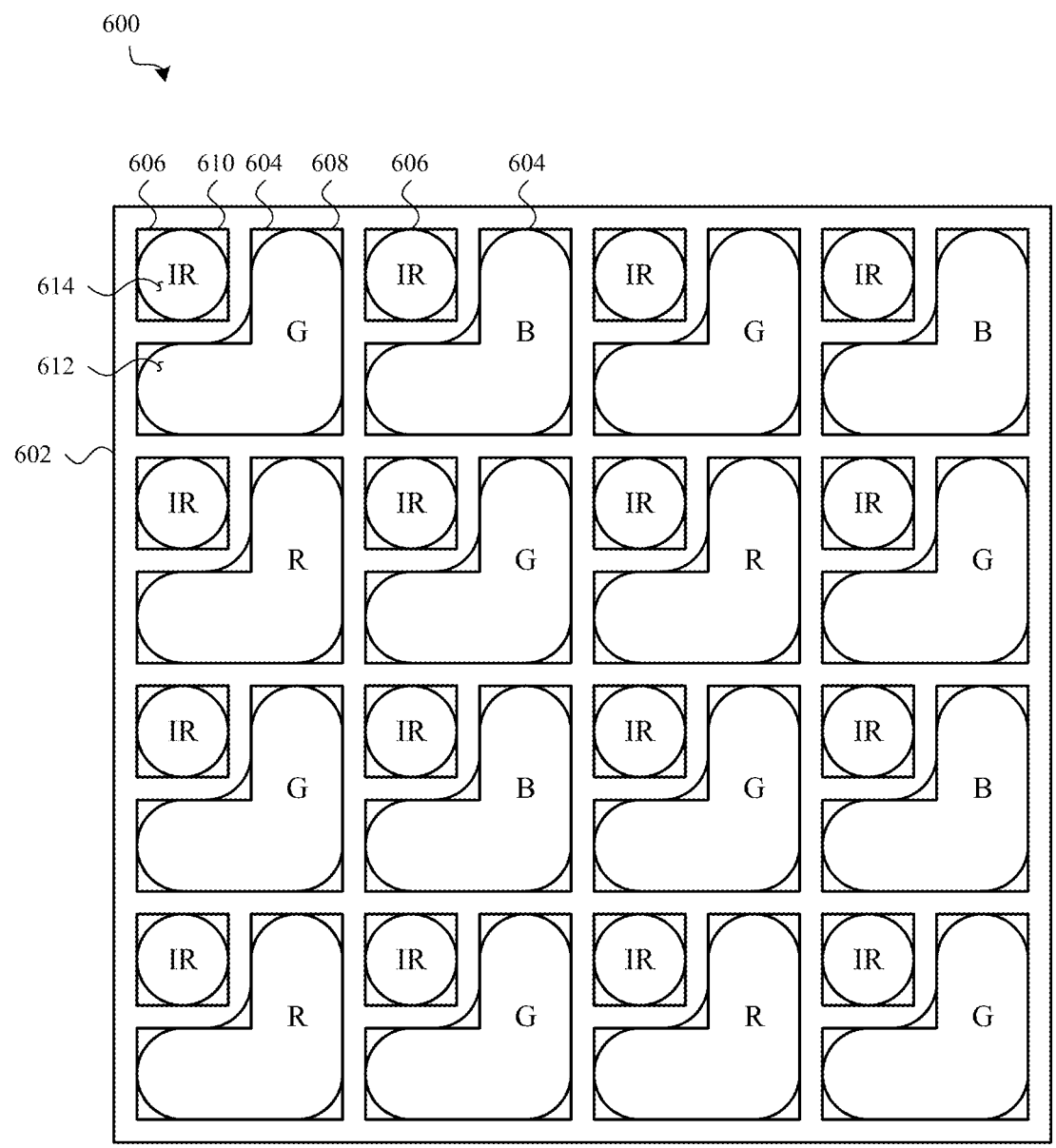
Figure 7:
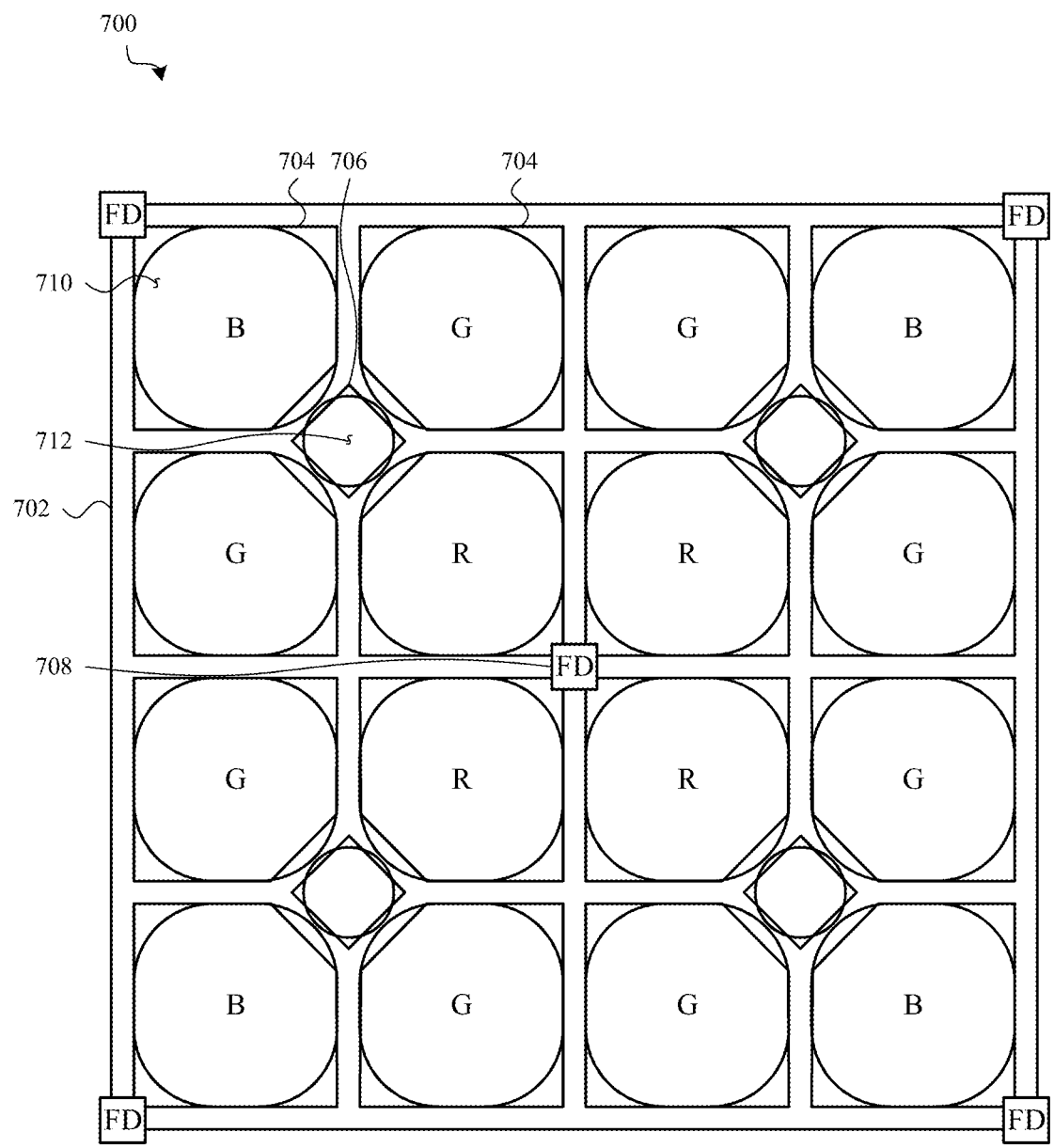
Figure 8:
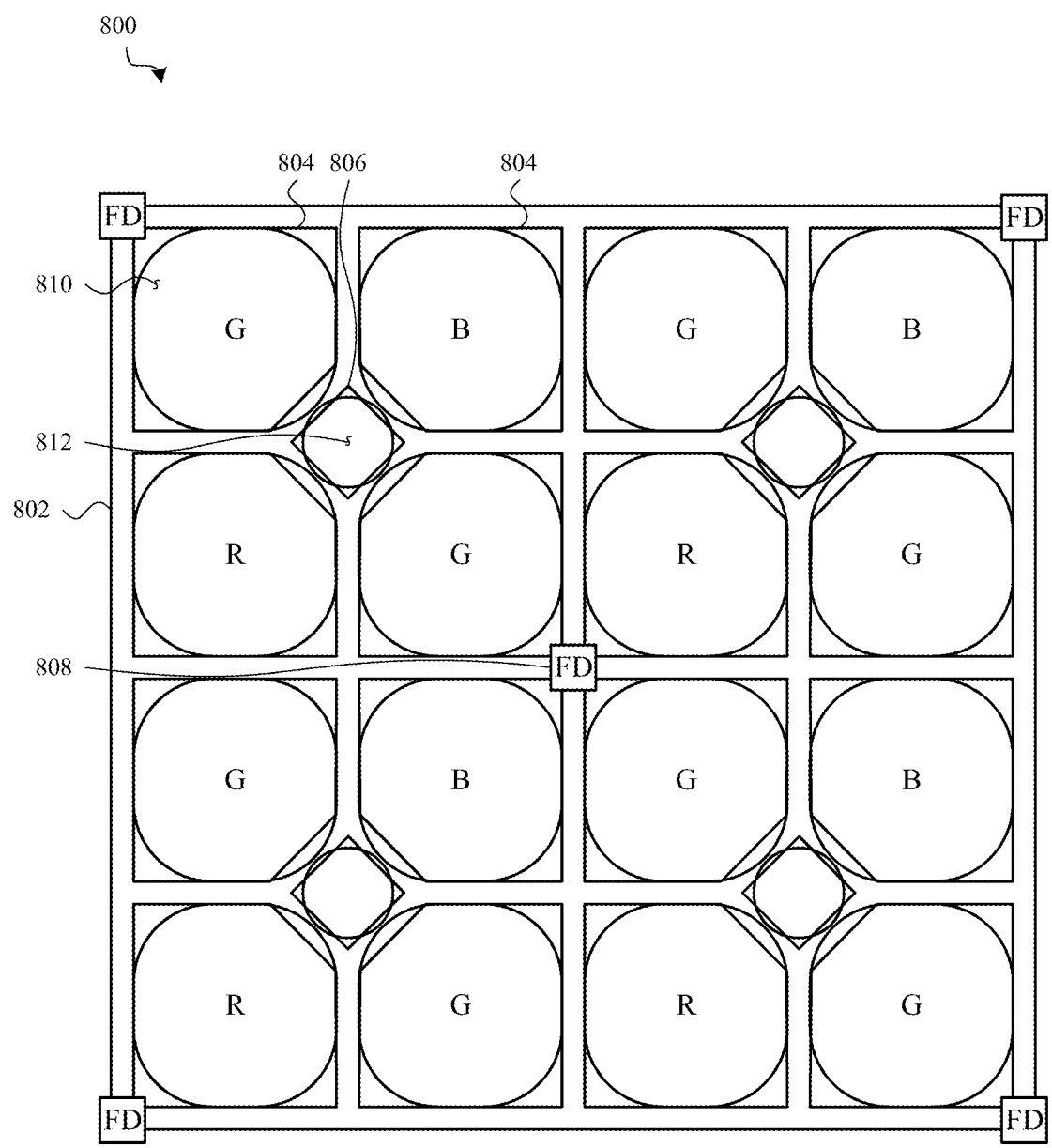
Figure 9:
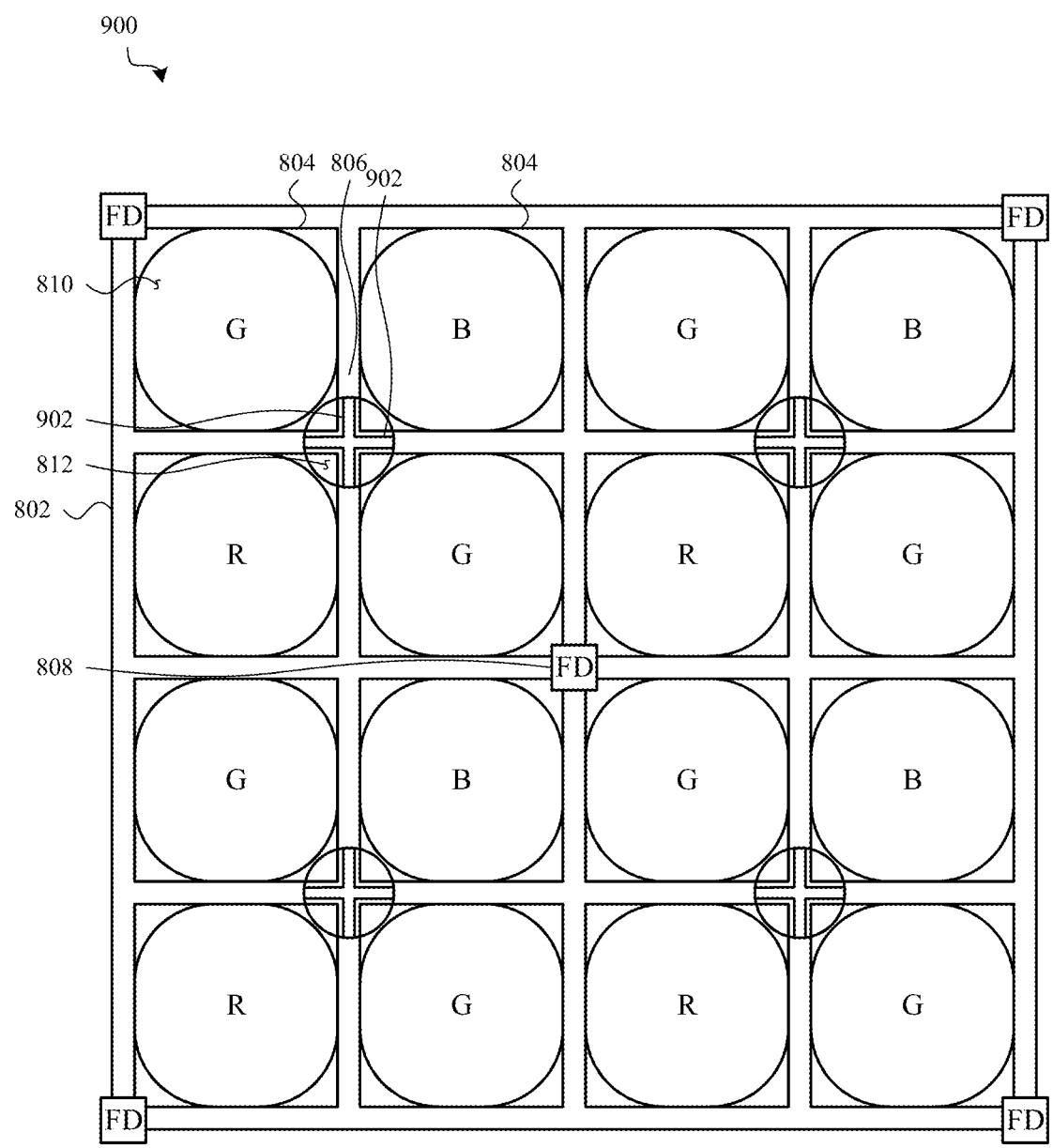

FIGS. 4A and 5-9 show various plan views of sensor modules having an array of image sensor pixels and an array of IR sensor pixels, in which IR sensor pixels of the array of IR sensor pixels are interspersed with image sensor pixels of the array of image sensor pixels. Each of the sensor modules may be constructed as described in FIGS. 1A-2B or in other ways. FIGS. 4A, 5, and 6 show examples in which silicon-based image sensor pixels of the array of silicon-based image sensor pixels have a one-to-one correspondence with IR sensor pixels of the array of IR sensor pixels. FIGS. 7-9 show examples in which a first total number of silicon-based image sensor pixels of the array of silicon-based image sensor pixels is greater than a second total number of IR sensor pixels of the array of IR sensor pixels (e.g., in some embodiments, the first total number may be an integer multiple of the second total number).

FIG. 4A shows a first example plan view of a sensor module 400. The sensor module 400 includes a set (e.g., a grid) of isolation walls 402. The set of isolation walls 402 defines an array of silicon-based image sensor pixels 404. The set of isolation walls 402 also defines an array of cavities that include an IR-sensitive material, with the IR-sensitive material in the array of cavities defining an array of IR sensor pixels 406. An array of color filters may be positioned over the image sensor pixels 404. In some embodiments, an array of Bayer pattern color filter arrays may be tiled over the image sensor pixels 404 such that each of a first green (G) color filter, a second green (G) color filter, a red (R) color filter, or a blue (B) color filter is disposed over a respective image sensor pixel 404 of a 2×2 subset of image sensor pixels 404. Alternatively, an array of Bayer pattern color filter arrays may be tiled over the image sensor pixels 404 such that each of a first green color filter, a second green color filter, a red color filter, or a blue color filter is disposed over a respective subset of four image sensor pixels 404 (e.g., a 2×2 subset of image sensor pixels 404).

Each image sensor pixel 404 is adjacent a respective IR sensor pixel 406 such that the image sensor pixels 404 and IR sensor pixels 406 have a one-to-one correspondence. A first light-receiving surface of each silicon-based image sensor pixel 404 has a first area 408, and a second light-receiving surface of each IR sensor pixel 406 has a second area 410. The first area 408 is a same size as the second area 410. The first area 408 also has a same shape as the second area 410.

The sensor module 400 is advantageous in that it provides a high IR quantum efficiency (QE) (e.g., a QE similar to that of the image sensor pixels 404), which may be useful when the array of IR sensor pixels 406 is used for applications such as bio-authentication (e.g., facial recognition). The sensor module 400 also provides full resolution visible (e.g., red-green-blue (RGB)) and IR images. Also, same size microlenses 412, 414 may be formed on (or attached to) the arrays of image sensor pixels 404 and IR sensor pixels 406, which can reduce the complexity (e.g., number of different operations) needed to form or attach the microlenses 412, 414 (e.g., in some cases, the microlenses 412, 414 may be formed or attached as part of a sensor module-wide operation or set of operations, independently of whether a particular pixel is an image sensor pixel 404 or an IR sensor pixel 406; in other cases, one subset of microlenses may be formed or attached after the other subset of microlenses, without changing the process flow).

Figure 4B:
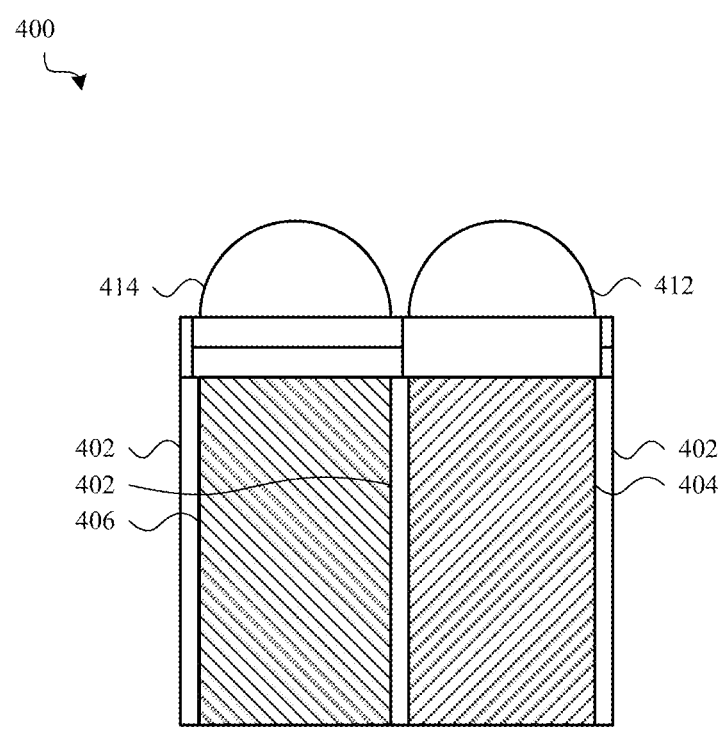
FIG. 4B shows an elevation of a portion of the sensor module described with reference to FIG. 4A.

FIG. 4B shows an elevation, taken along view line 4B-4B, of a portion of the sensor module 400 described with reference to FIG. 4A. In contrast to what is shown in FIG. 1H, the microlenses 412, 414 have a same size and shape.

FIG. 5 shows a second example plan view of a sensor module 500. The sensor module 500 includes a set (e.g., a grid) of isolation walls 502. The set of isolation walls 502 defines an array of silicon-based image sensor pixels 504. The set of isolation walls 502 also defines an array of cavities that include an IR-sensitive material, with the IR-sensitive material in the array of cavities defining an array of IR sensor pixels 506. An array of color filters may be positioned over the image sensor pixels 504. In some embodiments, an array of Bayer pattern color filter arrays may be tiled over the image sensor pixels 504 such that each of a first green color filter, a second green color filter, a red color filter, or a blue color filter is disposed over a respective image sensor pixel 504 of a 2×2 subset of image sensor pixels 504. Alternatively, an array of Bayer pattern color filter arrays may be tiled over the image sensor pixels 504 such that each of a first green color filter, a second green color filter, a red color filter, or a blue color filter is disposed over a respective subset of four image sensor pixels 504 (e.g., a 2×2 subset of image sensor pixels 504).

Each image sensor pixel 504 is adjacent a respective IR sensor pixel 506 such that the image sensor pixels 504 and IR sensor pixels 506 have a one-to-one correspondence. A first light-receiving surface of each silicon-based image sensor pixel 504 has a first area 508, and a second light-receiving surface of each IR sensor pixel 506 has a second area 510. The first area 508 is greater than the second area 510.

Optionally, a set of microlenses 512, 514 may be formed on (or attached to) the arrays of image sensor pixels 504 and IR sensor pixels 506.

The sensor module 500 is advantageous in that it provides a higher QE for the image sensor pixels 504, which may be useful when the array of IR sensor pixels 506 is used for applications such as visual odometry (e.g., identifying features in a field of view). Although the IR sensor pixels 506 have a lower QE in comparison to the sensor module described with reference to FIGS. 4A and 4B, the QE may be much higher than if an array of IR sensor pixels were to be formed behind an array of image sensor pixels (e.g., because there is no FEOL/BEOL structures to interfere with the reception of IR light). The sensor module 500 provides full resolution visible (e.g., RGB) and IR images, similarly to the sensor module described with reference to FIGS. 4A and 4B.

FIG. 6 shows a third example plan view of a sensor module 600. The sensor module 600 includes a set (e.g., a grid) of isolation walls 602. The set of isolation walls 602 defines an array of silicon-based image sensor pixels 604. The set of isolation walls 602 also defines an array of cavities that include an IR-sensitive material, with the IR-sensitive material in the array of cavities defining an array of IR sensor pixels 606. An array of color filters may be positioned over the image sensor pixels 604. In some embodiments, an array of Bayer pattern color filter arrays may be tiled over the image sensor pixels 604 such that each of a first green color filter, a second green color filter, a red color filter, or a blue color filter is disposed over a respective image sensor pixel 604 of a 2×2 subset of image sensor pixels 604. Alternatively, an array of Bayer pattern color filter arrays may be tiled over the image sensor pixels 604 such that each of a first green color filter, a second green color filter, a red color filter, or a blue color filter is disposed over a respective subset of four image sensor pixels 604 (e.g., a 2×2 subset of image sensor pixels 604).

Each image sensor pixel 604 is adjacent a respective IR sensor pixel 606 such that the image sensor pixels 604 and IR sensor pixels 606 have a one-to-one correspondence. However, the IR sensor pixels 606 are smaller than those shown in FIGS. 4A-5, and each image sensor pixel 604 extends along two sides of a corresponding IR sensor pixel 606. A first light-receiving surface of each silicon-based image sensor pixel 604 has a first area 608, and a second light-receiving surface of each IR sensor pixel 606 has a second area 610. The first area 608 is greater than the second area 610 and, in some embodiments, is 3-4 times the second area 610. Stated differently, the first area 608 may have a first maximum width orthogonal to a first maximum length; the second area 610 may have a second maximum width orthogonal to a second maximum length; the second maximum width may be less than the first maximum width; and the second maximum length may be less than the first maximum length.

Optionally, a set of microlenses 612, 614 may be formed on (or attached to) the arrays of image sensor pixels 604 and IR sensor pixels 606.

The sensor module 600 is advantageous in that it provides an even higher QE for the image sensor pixels 604 (i.e., higher than what is achieved in the sensor module of FIG. 5). Similarly to previously described sensor modules, the sensor module 600 provides full resolution visible (e.g., RGB) and IR images.

In some embodiments of the sensor module 600 (or other sensor modules described herein), the outputs of multiple IR sensor pixels 606 may be binned together (e.g., summed) in a charge domain or a digital domain. For example, the outputs of a 2×2 or 3×3 array of IR sensor pixels may be binned, to increase IR sensor pixel sensitivity and signal-to-noise ratio (SNR). Although this reduces the resolution of the array of IR sensor pixels, lower resolution may be acceptable for some IR applications.

FIG. 7 shows a fourth example plan view of a sensor module 700. The sensor module 700 includes a set (e.g., a grid) of isolation walls 702. The set of isolation walls 702 defines an array of silicon-based image sensor pixels 704. The set of isolation walls 702 also defines an array of cavities that include an IR-sensitive material, with the IR-sensitive material in the array of cavities defining an array of IR sensor pixels 706. An array of Bayer pattern color filter arrays may be tiled over the image sensor pixels 704 such that each of a first green color filter, a second green color filter, a red color filter, or a blue color filter is disposed over a respective subset of four image sensor pixels 704 (e.g., a 2×2 subset of image sensor pixels 704). In some embodiments, a 2×2 subset of image sensor pixels 704 disposed under a shared color filter (or, equivalently, a set of same colored color filters) may share a floating diffusion (FD) node 708 and other readout circuitry. In one mode of operation, a value may be read out of the sensor module 700 for each image sensor pixel 704. In another mode of operation, a binned value may be read out for each 2×2 subset of image sensor pixels 704 that is disposed under a shared color filter.

Each IR sensor pixel 706 may be positioned at a corner of a subset of four image sensor pixels 704. In some embodiments, an IR sensor pixel 706 is positioned at each corner of each subset of four image sensor pixels 704. Thus, there are fewer IR sensor pixels 706 than there are image sensor pixels 704 (i.e., there are four times fewer IR sensor pixels 706 as there are image sensor pixels 704).

Optionally, a set of microlenses 710, 712 may be formed on (or attached to) the arrays of image sensor pixels 704 and IR sensor pixels 706.

The sensor module 700 is advantageous in that it provides a higher QE for the image sensor pixels 704 (i.e., higher than what is achieved in the sensor module of FIG. 6). However, in contrast to the sensor modules described with reference to FIGS. 4A-6, the sensor module 700 does not provide a full resolution IR image. That said, same resolution visible images and IR images may be generated by the sensor module 700 if the values of each 2×2 subset of image sensor pixels 704 are binned but the values of the IR sensor pixels 706 are not binned.

In some embodiments of the sensor module 700, the outputs of multiple IR sensor pixels 706 may be binned together (e.g., summed) in a charge domain or a digital domain. For example, the outputs of a 2×2 or 3×3 array of IR sensor pixels may be binned, to increase IR sensor pixel sensitivity and SNR. Although this reduces the resolution of the array of IR sensor pixels, lower resolution may be acceptable for some IR applications.

FIG. 8 shows a fifth example plan view of a sensor module 800. The sensor module 800 includes a set (e.g., a grid) of isolation walls 802. The set of isolation walls 802 defines an array of silicon-based image sensor pixels 804. The set of isolation walls 802 also defines an array of cavities that include an IR-sensitive material, with the IR-sensitive material in the array of cavities defining an array of IR sensor pixels 806. An array of Bayer pattern color filter arrays may be tiled over the image sensor pixels 804 such that each of a first green color filter, a second green color filter, a red color filter, or a blue color filter is disposed over a respective singular image sensor pixel 804 of a 2×2 subset of image sensor pixels 804. In some embodiments, a 2×2 subset of image sensor pixels 804 disposed under a Bayer pattern color filter array may share an FD node 808 and other readout circuitry.

Each IR sensor pixel 806 may be positioned at a corner of a Bayer pattern color filter array. In some embodiments, an IR sensor pixel 806 is positioned at each corner of each Bayer pattern color filter array. Thus, there are fewer IR sensor pixels 806 than there are image sensor pixels 804 (i.e., there are four times fewer IR sensor pixels 806 as there are image sensor pixels 804).

Optionally, a set of microlenses 810, 812 may be formed on (or attached to) the arrays of image sensor pixels 804 and IR sensor pixels 806.

The sensor module 800 provides QEs for the image sensor pixels 804 and IR sensor pixels 806 that are similar to those achieved by the sensor module of FIG. 7. Similar to the sensor modules described with reference to FIG. 7, the sensor module 800 does not provide a full resolution IR image.

In some embodiments of the sensor module 800, the outputs of multiple IR sensor pixels 806 may be binned together (e.g., summed) in a charge domain or a digital domain. For example, the outputs of a 2×2 or 3×3 array of IR sensor pixels may be binned, to increase IR sensor pixel sensitivity and SNR. Although this reduces the resolution of the array of IR sensor pixels, lower resolution may be acceptable for some IR applications.

FIG. 9 shows a sixth example plan view of a sensor module 900. The sensor module 900 is similar to the sensor module described with reference to FIG. 8, except for the shape of the IR sensor pixels 806. In the sensor module 900, each IR sensor pixel 806 includes a set of fins 902, with each fin 902 extending between a pair of adjacent image sensor pixels 804 of the array of image sensor pixels 804.

An advantage of the sensor module 900 is that the IR sensor pixels 806 may be essentially formed within the set of isolation walls 802, maximizing the QE of the image sensor pixels 804. Additionally, the fins 902 of the IR sensor pixels 806 facilitate deposition of the IR-sensitive material due to less surface tension.

Figure 10A:
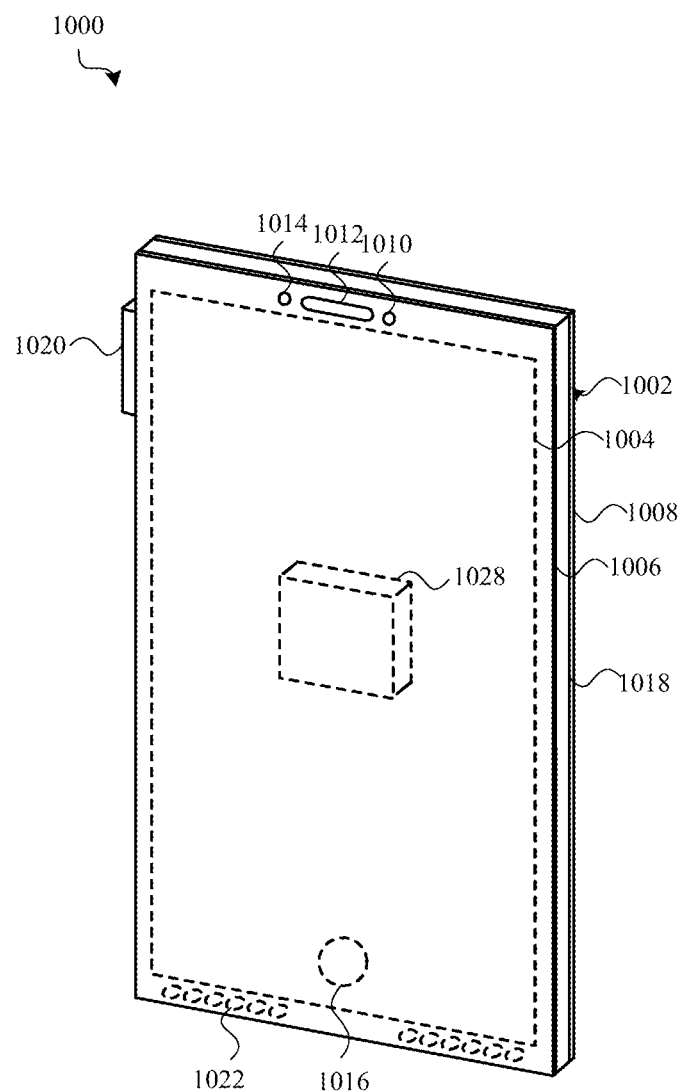
FIGS. 10A and 10B show an example embodiment of an electronic device.
Figure 10B:
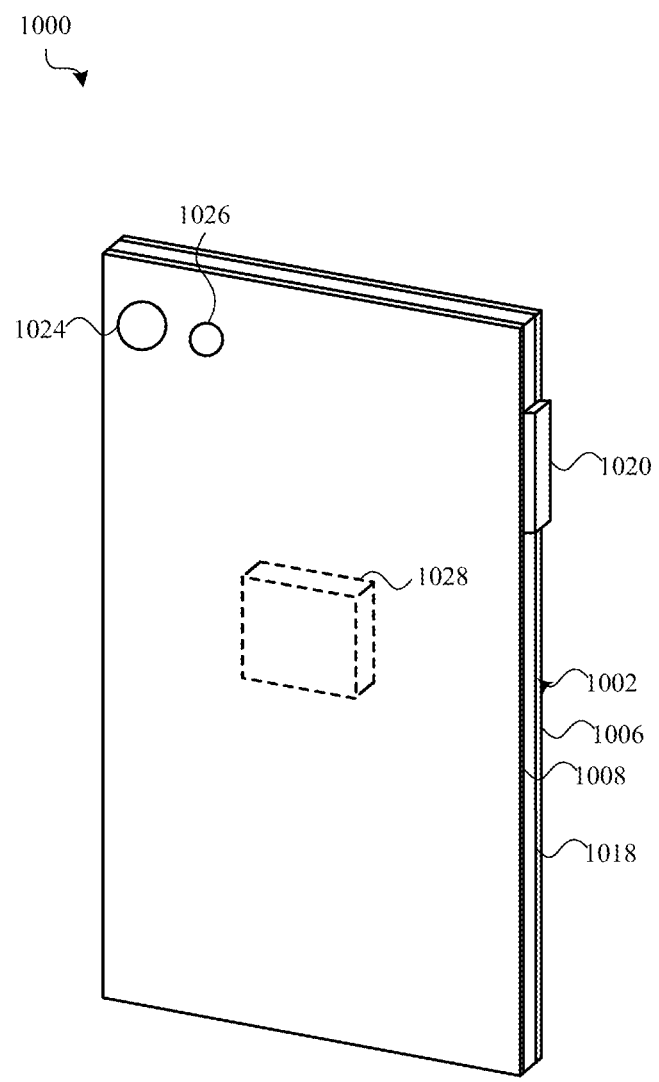

FIGS. 10A and 10B show an example embodiment of an electronic device 1000 that includes a sensor module such as one of the sensor modules described with reference to FIG. 1H, 4A, 5, 6, 7, 8, or 9. The device's dimensions and form factor, including the ratio of the length of its long sides to the length of its short sides, suggest that the device 1000 is a mobile phone (e.g., a smartphone). However, the device's dimensions and form factor are arbitrarily chosen, and the device 1000 could alternatively be any portable electronic device including, for example a mobile phone, tablet computer, portable computer, portable music player, wearable device (e.g., an electronic watch, health monitoring device, or activity or fitness tracking device), augmented reality (AR) device, virtual reality (VR) device, mixed reality (MR) device, gaming device, portable terminal, digital single-lens reflex (DSLR) camera, video camera, navigation or machine vision system, vehicle, robot, or other type of portable or mobile electronic device. The device 1000 could also be a device that is semi-permanently located (or installed) at a single location, such as a security monitor or appliance (e.g., a doorbell). FIG. 10A shows a front isometric view of the device 1000, and FIG. 10B shows a rear isometric view of the device 1000.

The device 1000 may include a housing 1002 that at least partially surrounds a display 1004. The housing 1002 may include or support a front cover 1006 and/or a back cover 1008 (e.g., a front cover 1006 opposite a back cover 1008). The front cover 1006 may be positioned over the display 1004 and provide a window through which the display 1004 may be viewed. In some embodiments, the display 1004 may be attached to (or abut) the housing 1002 and/or the front cover 1006. In alternative embodiments of the device 1000, the display 1004 may not be included and/or the housing 1002 may have an alternative configuration.

The display 1004 may include one or more light-emitting elements, and in some cases may be a light-emitting diode (LED) display, an organic LED (OLED) display, a liquid crystal display (LCD), an electroluminescent (EL) display, or another type of display. In some embodiments, the display 1004 may include, or be associated with, one or more touch and/or force sensors that are configured to detect a touch and/or a force applied to a surface of the front cover 1006.

The various components of the housing 1002 may be formed from the same or different materials. For example, a sidewall 1018 of the housing 1002 may be formed using one or more metals (e.g., stainless steel), polymers (e.g., plastics), ceramics, or composites (e.g., carbon fiber). In some cases, the sidewall 1018 may be a multi-segment sidewall including a set of antennas. The antennas may form structural components of the sidewall 1018. The antennas may be structurally coupled (to one another or to other components) and electrically isolated (from each other or from other components) by one or more non-conductive segments of the sidewall 1018. The front cover 1006 may be formed, for example, using one or more of glass, a crystal (e.g., sapphire), or a transparent polymer (e.g., plastic) that enables a user to view the display 1004 through the front cover 1006. In some cases, a portion of the front cover 1006 (e.g., a perimeter portion of the front cover 1006) may be coated with an opaque ink to obscure components included within the housing 1002. The back cover 1008 may be formed using the same material(s) that are used to form the sidewall 1018 or the front cover 1006. In some cases, the back cover 1008 may be part of a monolithic element that also forms the sidewall 1018 (or in cases where the sidewall 1018 is a multi-segment sidewall, those portions of the sidewall 1018 that are conductive or non-conductive). In still other embodiments, all of the exterior components of the housing 1002 may be formed from a transparent material, and components within the device 1000 may or may not be obscured by an opaque ink or opaque structure within the housing 1002.

The front cover 1006 may be mounted to the sidewall 1018 to cover an opening defined by the sidewall 1018 (i.e., an opening into an interior volume in which various electronic components of the device 1000, including the display 1004, may be positioned). The front cover 1006 may be mounted to the sidewall 1018 using fasteners, adhesives, seals, gaskets, or other components.

A display stack or device stack (hereafter referred to as a "stack") including the display 1004 may be attached (or abutted) to an interior surface of the front cover 1006 and extend into the interior volume of the device 1000. In some cases, the stack may include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 1006 (e.g., to a display surface of the device 1000).

In some cases, a force sensor (or part of a force sensor system) may be positioned within the interior volume above, below, and/or to the side of the display 1004 (and in some cases within the device stack). The force sensor (or force sensor system) may be triggered in response to the touch sensor detecting one or more touches on the front cover 1006 (or a location or locations of one or more touches on the front cover 1006), and may determine an amount of force associated with each touch, or an amount of force associated with a collection of touches as a whole. In some embodiments, the force sensor (or force sensor system) may be used to determine a location of a touch, or a location of a touch in combination with an amount of force of the touch. In these latter embodiments, the device 1000 may not include a separate touch sensor.

As shown primarily in FIG. 10A, the device 1000 may include various other components. For example, the front of the device 1000 may include one or more front-facing cameras 1010 (including one or more image sensors), light sources 1012, speakers 1014, microphones, or other components (e.g., audio, imaging, and/or sensing components) that are configured to transmit or receive signals to/from the device 1000. In some cases, the front-facing cameras 1010, alone or in combination with other sensors or components (e.g., the light sources 1012), may be configured to operate as a front-facing photography camera and an IR bio-authentication or facial recognition sensor. In some embodiments, the front-facing cameras 1010 may be configured as described with reference to one or more of FIGS. 1A-9. The device 1000 may also include various input devices, including a mechanical or virtual button 1016, which may be accessible from the front surface (or display surface) of the device 1000.

The device 1000 may also include buttons or other input devices positioned along the sidewall 1018 and/or on a rear surface of the device 1000. For example, a volume button or multipurpose button 1020 may be positioned along the sidewall 1018, and in some cases may extend through an aperture in the sidewall 1018. The sidewall 1018 may include one or more ports 1022 that allow air, but not liquids, to flow into and out of the device 1000. In some embodiments, one or more sensors may be positioned in or near the port(s) 1022. For example, an ambient pressure sensor, ambient temperature sensor, internal/external differential pressure sensor, gas sensor, particulate matter concentration sensor, or air quality sensor may be positioned in or near a port 1022.

In some embodiments, the rear surface of the device 1000 may include one or more rear-facing cameras 1024 (including one or more image sensors; see FIG. 10B). A flash or light source 1026 may also be positioned on the rear of the device 1000 (e.g., near the rear-facing camera(s)). In some cases, the rear-facing camera(s) may include a rear-facing photography camera and an IR depth sensor. In some embodiments, the rear-facing cameras 1024 may be configured as described with reference to one or more of FIGS. 1A-9.

The device 1000 may include a processor or controller 1028 for performing various functions, including, for example, communication, sensing, imaging, location-finding, charging, powering, or processing functions. In some embodiments, the processor or controller 1028 may be configured to operate a visible light image sensor and an IR light image sensor (of the front-facing cameras 1010 or, alternatively, the rear-facing cameras 1024) in parallel, for simultaneous acquisition of a visible light image and an IR light image. In some embodiments, the processor or controller 1028 may use the IR light image to adjust characteristics of the visible light image. In some embodiments, the processor or controller 1028 may use the visible and IR light images for different purposes (e.g., photography (visible light image) versus bio-authentication or facial recognition (IR light image)).

In some embodiments, the processor or controller 1028 may be configured to operate a visible light image sensor and an IR light image sensor (of the front-facing cameras 1010 or, alternatively, the rear-facing cameras 1024) sequentially, for sequential acquisition of a visible light image and an IR light image.

In some embodiments, the processor or controller 1028 may operate a light source and cause the light source to illuminate at least part of a FoV of an image sensor while the image sensor is operated to acquire an image. When a visible light image is acquired, and in some embodiments, a flood or flash visible light source may be caused to illuminate at least part of the FoV. When an IR light image is acquired, and in some embodiments, a flood or structured IR light source may be caused to illuminate at least part of the FoV.

Figure 11:
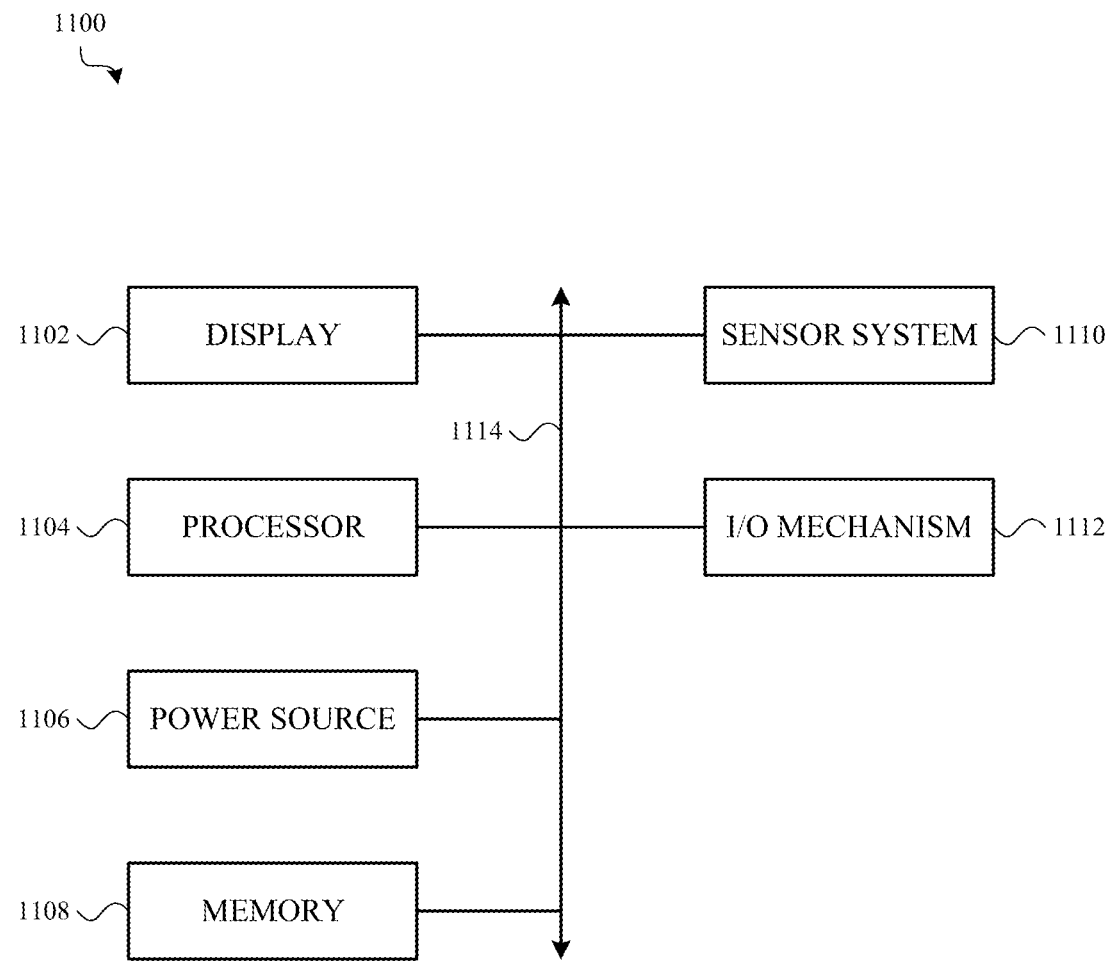
FIG. 11 shows an example electrical block diagram of an electronic device.

FIG. 11 shows an example electrical block diagram of an electronic device 1100 that includes one or more of the sensor modules described with reference to FIGS. 1A-9. The electronic device 1100 may take forms such as a hand-held or portable device (e.g., a smartphone, tablet computer, or electronic watch), a navigation system of a vehicle, and so on. The electronic device 1100 may include an optional display 1102 (e.g., a light-emitting display), a processor 1104, a power source 1106, a memory 1108 or storage device, a sensor system 1110, and an optional input/output (I/O) mechanism 1112 (e.g., an input/output device and/or input/output port). The processor 1104 may control some or all of the operations of the electronic device 1100. The processor 1104 may communicate, either directly or indirectly, with substantially all of the components of the electronic device 1100. For example, a system bus or other communication mechanism 1114 may provide communication between the processor 1104, the power source 1106, the memory 1108, the sensor system 1110, and/or the input/output mechanism 1112.

The processor 1104 may be implemented as any electronic device capable of processing, receiving, or transmitting data or instructions. For example, the processor 1104 may be a microprocessor, a central processing unit (CPU), an ASIC, a digital signal processor (DSP), or combinations of such devices. As described herein, the term "processor" is meant to encompass a single processor or processing unit, multiple processors, multiple processing units, or other suitably configured computing element or elements.

In some embodiments, the components of the electronic device 1100 may be controlled by multiple processors. For example, select components of the electronic device 1100 may be controlled by a first processor and other components of the electronic device 1100 may be controlled by a second processor, where the first and second processors may or may not be in communication with each other.

The power source 1106 may be implemented with any device capable of providing energy to the electronic device 1100. For example, the power source 1106 may include one or more disposable or rechargeable batteries. Additionally or alternatively, the power source 1106 may include a power connector, power cord, wireless charging circuit, or other device that connects the electronic device 1100 to another power source, such as a wall outlet or wireless charger.

The memory 1108 may store electronic data that may be used by the electronic device 1100. For example, the memory 1108 may store electrical data or content such as, for example, audio and video files, documents and applications, device settings and user preferences, timing signals, control signals, data structures or databases, image data, maps, or focus settings. The memory 1108 may be configured as any type of memory. By way of example only, the memory 1108 may be implemented as random access memory, read-only memory, Flash memory, removable memory, other types of storage elements, or combinations of such devices.

The electronic device 1100 may also include one or more sensors defining the sensor system 1110. The sensors may be positioned substantially anywhere on the electronic device 1100. The sensor(s) may be configured to sense substantially any type of characteristic, such as but not limited to, touch, force, pressure, electromagnetic radiation (e.g., light), heat, movement, relative motion, biometric data, distance, and so on. For example, the sensor system 1110 may include a touch sensor, a force sensor, a heat sensor, a position sensor, a light or optical sensor, an accelerometer, a pressure sensor (e.g., a pressure transducer), a gyroscope, a magnetometer, a health monitoring sensor, an image sensor, and so on. Additionally, the one or more sensors may utilize any suitable sensing technology, including, but not limited to, capacitive, ultrasonic, resistive, optical, ultrasound, piezoelectric, and thermal sensing technology.

The I/O mechanism 1112 may transmit and/or receive data from a user or another electronic device. An I/O device may include a display, a touch sensing input surface such as a track pad, one or more buttons (e.g., a graphical user interface "home" button, or one of the buttons described herein), one or more cameras (including one or more of the sensor modules described herein), one or more microphones or speakers, one or more ports such as a microphone port, and/or a keyboard. Additionally or alternatively, an I/O device or port may transmit electronic signals via a communications network, such as a wireless and/or wired network connection. Examples of wireless and wired network connections include, but are not limited to, cellular, Wi-Fi, Bluetooth, IR, and Ethernet connections. The I/O mechanism 1112 may also provide feedback (e.g., a haptic output) to a user.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

As described above, one aspect of the present technology may be the gathering and use of data such as facial features or other bio-authentication data. The present disclosure contemplates that, in some instances, this gathered data may include personal information data (e.g., biological information) that uniquely identifies or can be used to identify, locate, contact, or diagnose a specific person. Such personal information data can include demographic data, location-based data, telephone numbers, email addresses, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to activate or deactivate various functions of the user's device, or gather performance metrics for the user's device or the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States (US), collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users may selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A sensor module, comprising:
    a silicon substrate;
    a set of isolation walls that defines, in the silicon substrate,
        an array of silicon-based image sensor pixels; and
        an array of cavities; and
    an infrared (IR)-sensitive material in the array of cavities and forming an array of IR sensor pixels in a same focal plane as the array of silicon-based image sensor pixels;
    wherein the IR-sensitive material comprises at least one of an organic material or a quantum film and an electrode is formed on the IR-sensitive material at an open end of each respective cavity of the array of cavities.

2. The sensor module of claim 1, wherein the silicon substrate is a first silicon substrate, the sensor module further comprising:
    a second silicon substrate bonded to the first silicon substrate; and
    a set of transistors on at least one of the first silicon substrate or the second silicon substrate, at least some transistors in the set of transistors providing readout circuitry electrically coupled to the array of silicon-based image sensor pixels or the array of IR sensor pixels.

3. The sensor module of claim 1, wherein silicon-based image sensor pixels of the array of silicon-based image sensor pixels have a one-to-one correspondence with IR sensor pixels of the array of IR sensor pixels.

4. The sensor module of claim 3, wherein:
    a first light-receiving surface of each silicon-based image sensor pixel of the array of silicon-based image sensor pixels has a first area;
    a second light-receiving surface of each IR sensor pixel of the array of IR sensor pixels has a second area; and
    the first area is a same size as the second area.

5. The sensor module of claim 4, wherein the first area and the second area have a same shape.

6. The sensor module of claim 3, wherein:
    a first light-receiving surface of each silicon-based image sensor pixel of the array of silicon-based image sensor pixels has a first area;
    a second light-receiving surface of each IR sensor pixel of the array of IR sensor pixels has a second area; and
    the first area is greater than the second area.

7. The sensor module of claim 6, wherein:
    the first area has a first maximum width orthogonal to a first maximum length;
    the second area has a second maximum width orthogonal to a second maximum length;
    the second maximum width is less than the first maximum width; and
    the second maximum length is less than the first maximum length.

8. The sensor module of claim 1, wherein a first total number of silicon-based image sensor pixels of the array of silicon-based image sensor pixels is greater than a second total number of IR sensor pixels of the array of IR sensor pixels.

9. The sensor module of claim 8, wherein the first total number is an integer multiple of the second total number.

10. The sensor module of claim 8, further comprising an array of Bayer pattern color filter arrays tiled over the array of silicon-based image sensor pixels, each Bayer pattern color filter array including a first green color filter, a second green color filter, a red color filter, and a blue color filter.

11. The sensor module of claim 10, wherein:
    for at least one Bayer pattern color filter array of the array of Bayer pattern color filter arrays, a respective singular silicon-based image sensor pixel of the array of silicon-based image sensor pixels is disposed under each of the first green color filter, the second green color filter, the red color filter, and the blue color filter; and
    IR sensor pixels of the array of IR sensor pixels are positioned at corners of at least some of the Bayer pattern color filter arrays.

12. The sensor module of claim 10, wherein:
for each Bayer pattern color filter array of the array of Bayer pattern color filter arrays, a different subset of four silicon-based image sensor pixels of the array of silicon-based image sensor pixels is disposed under each of the first green color filter, the second green color filter, the red color filter, and the blue color filter; and
IR sensor pixels of the array of IR sensor pixels are positioned at corners of at least some of the different subsets of the four silicon-based image sensor pixels.

13. The sensor module of claim 10, wherein an IR sensor pixel of the array of IR sensor pixels is positioned between a subset of silicon-based image sensor pixels.

14. The sensor module of claim 13, wherein the IR sensor pixel comprises a set of fins, each fin extending between a pair of adjacent silicon-based image sensor pixels of the array of silicon-based image sensor pixels.

15. A sensor module, comprising:
a silicon substrate;
an array of thermally annealed silicon-based image sensor pixels in the silicon substrate;
an array of infrared (IR) sensor pixels in a same focal plane as the array of thermally annealed silicon-based image sensor pixels, each IR sensor pixel including an IR-sensitive material comprising at least one of an organic material or a quantum film and each IR sensor pixel comprising an electrode formed on the IR-sensitive material; and
an application-specific integrated circuit (ASIC) bonded to the silicon substrate.

* * * * *